United States Patent
Maezawa

(10) Patent No.: US 11,744,307 B2
(45) Date of Patent: Sep. 5, 2023

(54) SIZE MEASUREMENT DEVICE AND SIZE MEASUREMENT SYSTEM

(71) Applicant: ZOZO, INC., Chiba (JP)

(72) Inventor: Yusaku Maezawa, Chiba (JP)

( * ) Notice: Subject to any disclaimer, the term of this patent is extended or adjusted under 35 U.S.C. 154(b) by 654 days.

(21) Appl. No.: 16/489,566

(22) PCT Filed: Dec. 13, 2017

(86) PCT No.: PCT/JP2017/044656
§ 371 (c)(1),
(2) Date: Aug. 28, 2019

(87) PCT Pub. No.: WO2018/159062
PCT Pub. Date: Sep. 7, 2018

(65) Prior Publication Data
US 2020/0060371 A1    Feb. 27, 2020

(30) Foreign Application Priority Data
Feb. 28, 2017    (JP) ................................ 2017-036483

(51) Int. Cl.
*A41H 1/02*    (2006.01)
*A41H 3/00*    (2006.01)
(Continued)

(52) U.S. Cl.
CPC .............. *A41H 1/02* (2013.01); *A41H 3/007* (2013.01); *G01B 7/02* (2013.01); *G01B 7/12* (2013.01); *G06Q 30/0631* (2013.01)

(58) Field of Classification Search
USPC ........ 33/512, 1 BB, 2 R, 17 R, 514.1, 514.2, 33/555.4
See application file for complete search history.

(56) References Cited

U.S. PATENT DOCUMENTS 1,404,812 A * 1/1922 Turner ................. A61B 5/1135
                                                    33/555.4
4,474,187 A * 10/1984 Timm ................... A61B 5/4393
                                                    600/587
(Continued)

FOREIGN PATENT DOCUMENTS

AU    2013204402 A    4/2013
CN    106413452 A    2/2017
(Continued)

OTHER PUBLICATIONS

International Search Report issued in PCT/JP2017/044656 dated Feb. 13, 2018 (including English translation) (6 pages).

*Primary Examiner* — Christopher W Fulton
(74) *Attorney, Agent, or Firm* — FisherBroyles, LLP; Rob L. Phillips

(57) ABSTRACT

[Problem] There are provided a size measurement apparatus and a size measurement system that even a user who has no specialized measurement technique can easily handle.
[Solution Means] A size measurement system includes a size measurement apparatus (10) configured to be attached to a body of a user to measure a size and the like of the body of the user and output sensor measurement information representing the measured size and the like, a user terminal (20) configured to be operated by the user who measures the body, and a management server (30) configured to manage size information, shape information, and the like of apparel merchandise and provide merchandise search result information that is user size information as body size information of the user based on the sensor measurement information and information concerning merchandise matching the size.

10 Claims, 17 Drawing Sheets

(51) Int. Cl.
  *G01B 7/02* (2006.01)
  *G01B 7/12* (2006.01)
  *G06Q 30/0601* (2023.01)

(56) References Cited

U.S. PATENT DOCUMENTS

| | | | | |
|---|---|---|---|---|
| 4,635,367 | A * | 1/1987 | Vigede | A41H 1/02 33/15 |
| 4,920,659 | A * | 5/1990 | Becher | G01B 3/1071 33/561.2 |
| 5,406,715 | A * | 4/1995 | Koizumi | G01B 3/1004 33/771 |
| 5,732,475 | A * | 3/1998 | Sacks | G01B 5/30 33/555.4 |
| 6,415,199 | B1 * | 7/2002 | Liebermann | A41H 3/007 33/512 |
| 6,640,202 | B1 * | 10/2003 | Dietz | A41H 1/02 342/146 |
| 8,307,560 | B2 * | 11/2012 | Tulin | G06Q 30/0201 33/17 R |
| 9,470,519 | B2 * | 10/2016 | Alkhalaf | A61B 5/107 |
| 9,858,611 | B2 * | 1/2018 | Cooper | G06Q 30/0635 |
| 10,154,791 | B2 * | 12/2018 | Longinotti-Buitoni | G06V 40/70 |
| 2015/0342266 | A1 | 12/2015 | Cooper | |
| 2017/0032444 | A1 | 2/2017 | Cooper | |
| 2017/0082418 | A1 * | 3/2017 | Gong | A61B 5/1075 |
| 2018/0010902 | A1 * | 1/2018 | Gong | A61B 5/1072 |

FOREIGN PATENT DOCUMENTS

| | | | |
|---|---|---|---|
| CN | 107348585 A | * 11/2017 | |
| JP | 3127490 U | 2/1990 | |
| JP | 2016-153729 A | 8/2016 | |
| JP | 2017-519120 A | 3/2017 | |
| WO | 2013/188908 A1 | 12/2013 | |
| WO | 2015/125455 A1 | 8/2015 | |
| WO | 2015/181661 A1 | 12/2015 | |
| WO | WO-2018086490 A1 | * 5/2018 | A41H 1/02 |

* cited by examiner

Fig 4
(a)
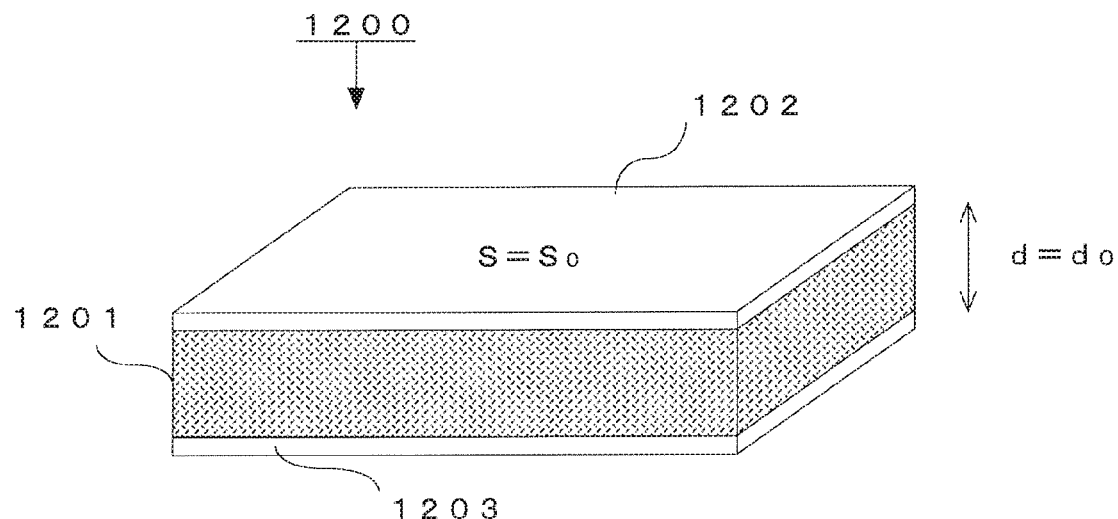
(b)
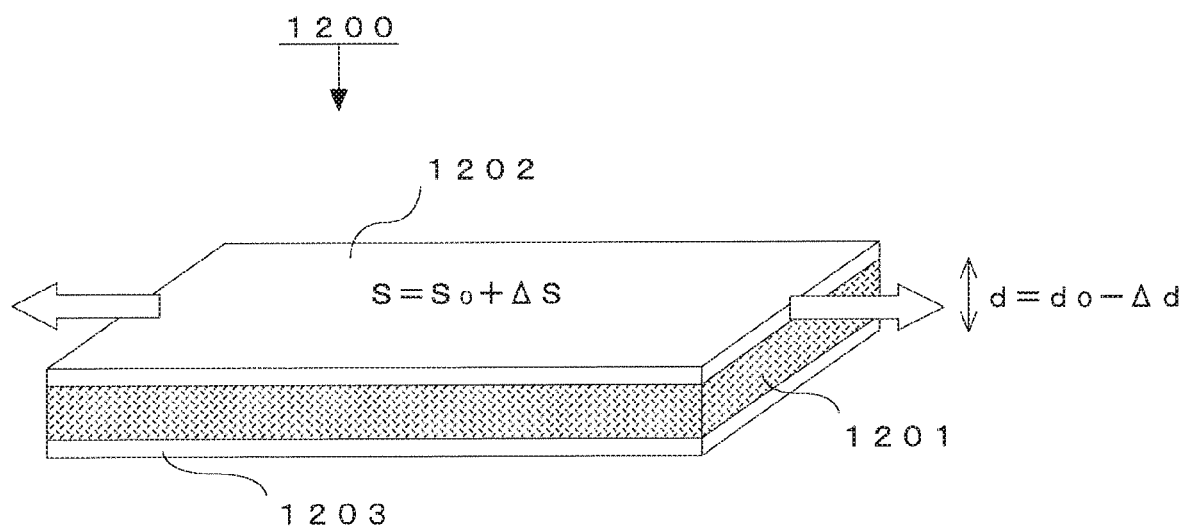

Fig. 8

USER MEASUREMENT DB 323

| USER ID | Sz1 | Sz2 | Sz3 | Sz4 | ... |
|---------|------|------|------|------|-----|
| 0001 | 78.0 | 86.9 | 56.3 | 56.1 | ... |
| 0002 | 68.2 | 83.3 | 52.0 | 51.6 | ... |
| 0003 | 85.9 | 98.2 | 69.2 | 67.9 | ... |
| 0004 | 75.6 | 85.2 | 55.3 | 55.2 | ... |
| ... | ... | ... | ... | ... | ... |

Fig. 9

MERCHANDISE DB 324

| MERCHANDISE ID | TYPE | COLOR | MANUFAC-TURER | PRICE | URL | MERCHANDISE SIZE INFORMATION |
|---|---|---|---|---|---|---|
| S0001 | COTTON PANTS | BEIGE | COMPANY A | 6,800 | ... | ... |
| S0002 | COTTON PANTS | GRAY | COMPANY A | 8,800 | ... | ... |
| S0003 | DENIMS | DENIMS | COMPANY A | 12,500 | ... | ... |
| S0004 | SWEAT SHIRT | GRAY | COMPANY B | 4,800 | ... | ... |
| ... | ... | ... | ... | ... | ... | ... |

Fig. 10

MERCHANDISE SIZE INFORMATION

| MERCHANDISE ID | Sz1 | Sz2 | Sz3 | Sz4 | ... |
|---|---|---|---|---|---|
| S0001 | 72.0 (70.0~75.0) | 84.0 (82.0~86.0) | 48.0 (44.0~54.0) | 48.0 (44.0~54.0) | ... |
| S0002 | 77.0 (75.0~80.0) | 90.0 (89.0~91.0) | 52.0 (53.0~56.0) | 52.0 (53.0~56.0) | ... |
| S0003 | 82.0 (80.0~86.0) | 96.0 (94.0~101.0) | 56.0 (54.0~59.0) | 56.0 (54.0~59.0) | ... |
| S0004 | 88.0 (86.0~94.0) | 104.0 (102.0~110.0) | 62.0 (58.0~65.0) | 62.0 (58.0~65.0) | ... |
| ... | ... | ... | ... | ... | ... |

Fig. 12
(a)
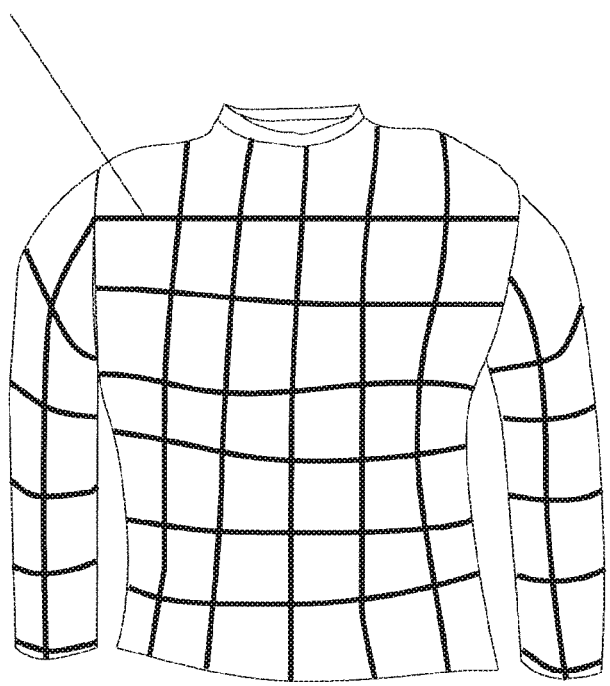
(b)
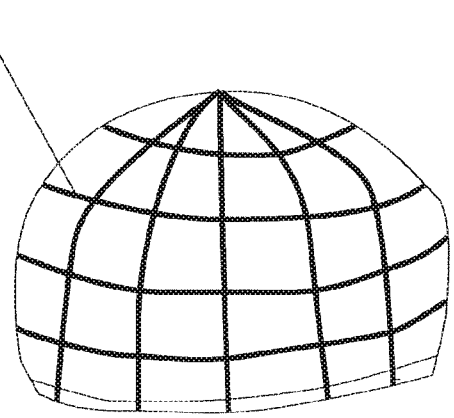

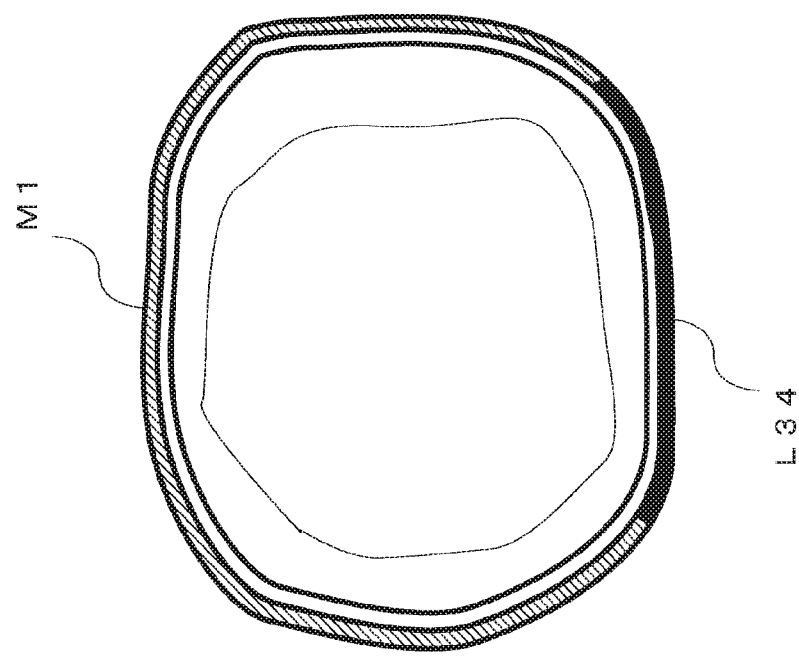
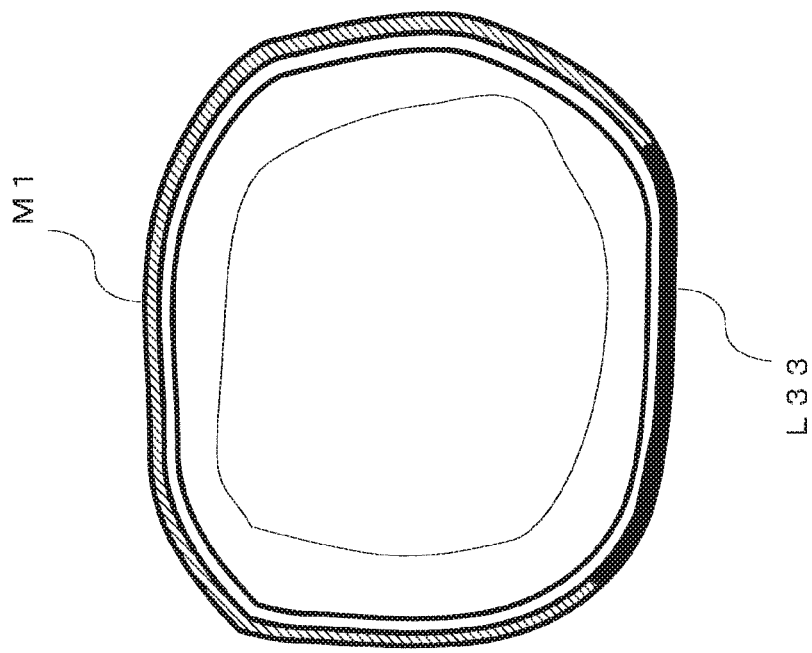
Fig. 17

SIZE MEASUREMENT DEVICE AND SIZE MEASUREMENT SYSTEM

CROSS-REFERENCE TO RELATED APPLICATIONS

The present invention is filed under 35 U.S.C. § 371 as the U.S. national phase of International Patent Application No. PCT/JP2017/044656, filed Dec. 13, 2017, which designated the United States and which claims priority to Japanese Patent Application No. 2017-036483, filed Feb. 28, 2017, each of which is hereby incorporated in its entirety including all tables, figures, and claims.

FIELD OF THE INVENTION

The present invention relates to a size measurement apparatus and a size measurement system and, more particularly, to a size measurement apparatus that is attached to a body of a user or an article to measure the size and the like of a portion to which the apparatus is attached and a size measurement system.

DESCRIPTION OF THE RELATED ART

In order to purchase merchandise or receive some services in daily life, the user is sometimes required to present the size of his/her body or article.

When, for example, purchasing apparel merchandise such as clothing and caps, the user purchases apparel merchandise with reference to the rough size information of his/her body, such as S, M, or L. Such apparel merchandise often differ in actual size depending on brands and manufacturers that sell the merchandise even if they have the same size indications (for example, S, M, and L), and hence the user needs to accurately grasp his/her own size in advance.

There has been proposed an anthropometric measure disclosed in patent literature 1 as a conventional technique for grasping in advance the size of a human body or article described above.

The anthropometric measure disclosed in patent literature 1 has a zero scale reference plate fixed to an end portion of the zero scale of a bendable flexible measuring tape. A scale reading plate is attached to the middle of the measuring tape so as to be slidable on the measuring tape. A middle portion of the scale reading plate is provided with a scale display unit that displays a scale and numbers of the measuring tape. The scale display unit is provided with a scale reading reference line. The measuring tape is slidable on the back surface of the scale display unit through through holes provided in the left and right sides of the scale display unit. Surface fasteners are respectively attached to predetermined portions of the front surface of the zero scale reference plate and the back surface of the scale reading plate. The positional relationship between the zero scale reference plate and the scale reading plate is set such that when they are aligned and overlapped on each other, the zero scale of the zero scale reference plate matches the scale reading reference line of the scale reading plate.

Using the anthropometric measure disclosed in patent literature 1 makes it possible to easily, reliably, and accurately measure the sizes of body parts such as the waist and the chest while the measuring tape is detached from a body part such as the waist.

CITATION LIST

Patent Literature

[Patent Literature 1] Utility Model Registration No. 3127490

SUMMARY OF THE INVENTION

Problems to be Solved by the Invention

Although the use of the anthropometric measure disclosed in patent literature 1 facilitates measurement as compared with usual measures, measurement values may vary depending on the person who measures. This may pose problems in terms of the accuracy of the measured size of a body part.

The present invention has been made in consideration of the above problem and has its object to provide a size measurement apparatus and a size measurement system that can be easily handled by even a user who has no specialized measurement technique.

Means for Solving the Problem

In order to achieve this object, according to the present invention, there is provided a size measurement apparatus that a user wears on a body part to specify a size and a shape of the body part, characterized by comprising measurement sensors each configured to measure a physical change amount based on a change in electric characteristic, the measurement sensor measuring a degree of extension of a base material caused by the shape of the body of the user.

The size measurement apparatus according to the present invention is characterized by comprising a main body unit in a clothing shape, wherein the measurement sensors are formed from an extensible material and arranged on the main body unit in a lattice shape.

The size measurement apparatus according to the present invention is characterized by comprising a main body unit in a clothing shape, wherein the measurement sensor is formed from an extensible material and arranged at an arbitrary position of the main body unit at which a clothing dimension or body dimension is usually measured.

The size measurement apparatus according to the present invention is characterized in that the measurement sensor is formed into an extensible band-like or ring-like shape.

The size measurement apparatus according to the present invention is characterized in that some of the measurement sensors are replaced with non-extensible portions formed from a non-extensible material.

The size measurement apparatus according to the present invention is characterized in that the measurement sensor comprises a pair of plate-like electrodes and a dielectric film arranged between the pair of electrodes and specifies a degree of extension of the electrodes caused by a shape of a body of a user based on a change in capacitance due to extension of the electrodes upon application of a tensile force.

The size measurement apparatus according to the present invention is characterized in that the measurement sensor comprises a plate-like electrode having extensibility and specifies a degree of extension of the electrode caused by a shape of a body of a user based on a change in electric resistance value due to extension of the electrode upon application of a tensile force.

A size measurement system according to the present invention is characterized by comprising the above size measurement apparatus, a user terminal configured to acquire data representing a change in electric characteristic measured by the measurement sensor from the size measurement apparatus, and a management server configured to acquire data representing the change in electric characteristic from the user terminal, convert the acquired data representing the change in electric characteristic into data representing a physical change amount, and provide the data to the user terminal.

A size measurement system according to the present invention is characterized by comprising the above size measurement apparatus, a user terminal configured to be operated by the user, and a management server configured to acquire data representing a change in electric characteristic from the measurement apparatus, convert the acquired data representing the change in electric characteristic into data representing a physical change amount, and provide the data to the user terminal.

The size measurement system according to the present invention is characterized in that the management server includes a database configured to manage a size and a shape of apparel merchandise, refers to the database upon conversion to data representing the physical change amount, searches for the apparel merchandise matching data representing the physical change amount, and transmits the search result to the user terminal.

The size measurement system according to the present invention is characterized in that the management server transmits, to the user terminal, information including a URL of a Web page for purchase of the apparel merchandise as merchandise search result information indicating a search result on the apparel merchandise, and the user terminal acquires a Web page for purchase of the apparel merchandise by using information including the URL.

In addition to the method, the apparatus, the system, the computer program, the recording medium storing the computer program, and the like described above, those obtained by interchanging any combinations of the above constituent elements and constituent elements and expressions of the present invention are effective as aspects of the present invention.

Effects of the Invention

The present invention is a size measurement apparatus that is attached to a user to specify a size and shape of a body part of the user to which the apparatus is attached. This apparatus includes a measurement sensor that measures a physical change amount based on a change in electric characteristic. The measurement sensor measures the degree of extension of a base material due to the shape of the body of the user. This allows even a user without any specialized measurement technique to easily handle the apparatus and easily perform measurement.

BRIEF DESCRIPTION OF THE DRAWINGS

FIG. 1 is a view showing the arrangement of a size measurement system according to the first embodiment of the present invention.

FIG. 2 is a view showing the outer appearance of a size measurement apparatus according to the first embodiment of the present invention.

FIG. 3 is a block diagram showing the arrangement of the size measurement apparatus according to the first embodiment of the present invention.

[FIG. 4] FIG. 4 is a sectional schematic view showing an example of the arrangement of a measurement sensor according to the first embodiment of the present invention, in which (a) is a view showing a state in which the sensor has not extended, and (b) is a view showing a state in which the sensor has extended in a plane direction.

FIG. 5 is a sectional plan view of the size measurement apparatus taken along a line A-A of the front view of FIG. 2.

FIG. 6 is a block diagram showing the arrangement of a user terminal according to the first embodiment of the present invention.

FIG. 7 is a block diagram showing the arrangement of a management server according to the first embodiment of the present invention.

[FIG. 8] FIG. 8 is a view showing an example of the data configuration of a user measurement DB according to the first embodiment of the present invention.

[FIG. 9] FIG. 9 is a view showing an example of the data configuration of a merchandise DB according to the first embodiment of the present invention.

[FIG. 10] FIG. 10 is a view showing in more detail the merchandise size information of data managed by the merchandise DB according to the first embodiment of the present invention.

FIG. 11 is a sequence chart showing a procedure for a measuring operation for the size and the like of the body of a user by the size measurement system according to the first embodiment of the present invention.

[FIG. 12] FIGS. 12(a) and 12(b) are views each showing the outer appearance of a size measurement apparatus according to a modification of the first embodiment of the present invention.

FIG. 13 is a front view showing the outer appearance of a size measurement apparatus according to the second embodiment of the present invention.

FIG. 14 is a sectional plane view of the size measurement apparatus taken along a line B-B of the front view of FIG. 13.

FIG. 15 is a front view showing the outer appearance of a size measurement apparatus according to the third embodiment of the present invention.

FIG. 16 is a sectional plan view of the size measurement apparatus taken along a line C-C of the front view of FIG. 15.

[FIG. 17] FIG. 17 is a sectional plan view of the size measurement apparatus taken along a line D-D of the front view of FIG. 15.

MODES FOR CARRYING OUT THE INVENTION

First Embodiment

[1] Outline of First Embodiment

A size measurement apparatus 10 according to the first embodiment of the present invention is attached to a measurement target to measure the size and shape of the measurement target to which the apparatus is attached.

This measurement target is, for example, the body of a user or another article.

A user terminal 20 is connected to the size measurement apparatus 10 via a near field communication network and the like. Upon acquiring data based on which the size and the like of a measurement target are derived, the user terminal 20 transmits the acquired data to a management server 30.

Upon receiving the data, the management server 30 refers to a database provided in itself to specify the size and the like of a measurement target and search for merchandise matching the size and shape of the measurement target. The management server 30 then provides the search result, the size information of the measurement target, and the like to the user terminal 20.

The user browses the search result, the size information, and the like by using the user terminal 20 and can directly order the merchandise indicated by the search result via an EC site.

Measurement targets are not specifically limited as described above. Assume that in the following description, for example, measurement targets include the body of a user, and the size measurement apparatus 10 has the shape of clothing (a shirt, tights, underpants, or the like) that the user wears.

Assume also that an example of merchandise matching a measurement target is apparel merchandise (clothing, cap, accessory, or the like) matching the size and shape of the body of a user.

Figure 1:
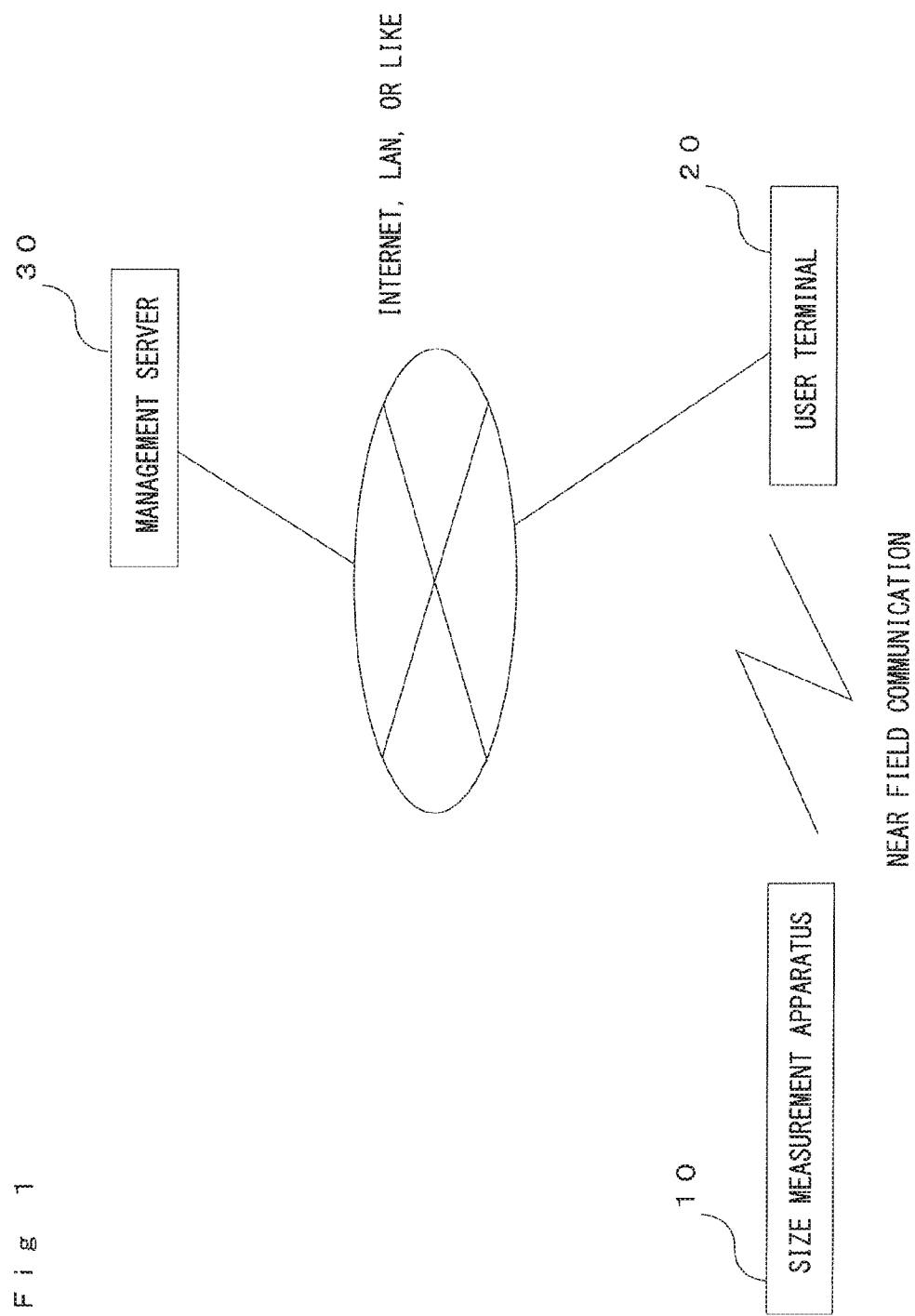
[FIG. 1]

[2] Arrangement of First Embodiment (1) Overall Arrangement of Size Measurement System FIG. 1 is a view showing the arrangement of the size measurement system according to the first embodiment of the present invention.

As shown in FIG. 1, the size measurement system includes the size measurement apparatus 10 that is attached to the body of a user to measure the size of the body of the user and output sensor measurement information representing the measured size and the like, the user terminal 20 that the user who measures the body operates, and the management server 30 that manages the size and shape information and the like of apparel merchandise and provides user size information as the body size information of the user based on the sensor measurement information and measurement search result information as information of merchandise matching the size.

The size measurement apparatus 10 and the user terminal 20 are communicably connected to each other via a network. For example, they are connected to each other via near field communication such as infrared communication, Wi-Fi (Registered trademark), or Bluetooth (Registered trademark).

The user terminal 20 can receive and acquire sensor measurement information including the size information of the body of the user measured by the size measurement apparatus 10 from the size measurement apparatus 10 via the network.

The management server 30 and the user terminal 20 are communicably connected to each other via a network, for example, the Internet or a LAN.

The user terminal 20 transmits the sensor measurement information acquired from the size measurement apparatus 10 to the management server 30 via the network.

Upon receiving the sensor measurement information from the user terminal 20, the management server 30 stores the information in its own database.

The management server 30 also transmits information concerning apparel merchandise matching the size of the body of the user to the user terminal 20.

The size measurement apparatus 10 measures the size and shape of the body of a user. A measurement target is not limited to any specific body part. Assume, however, that in this embodiment, the apparatus has the shape of tights and measures the size and shape of the body of a user, and the management server 30 provides information concerning apparel merchandise (pants, underpants, tights, or the like) matching the size and shape of the body of the user.

(2) Arrangement of Size Measurement Apparatus 10

Overall Arrangement of Size Measurement Apparatus 10

Figure 2:
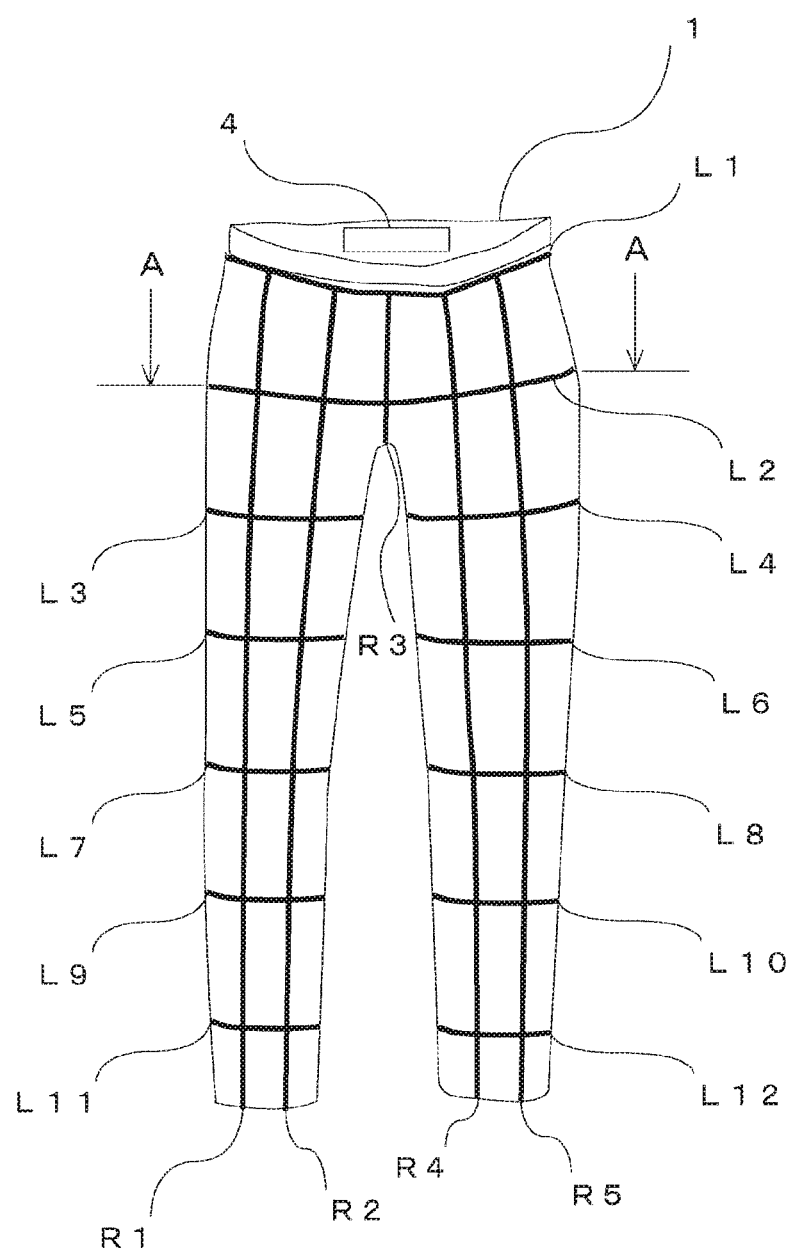
[FIG. 2]

FIG. 2 is a view showing the outer appearance of the size measurement apparatus 10 according to the first embodiment of the present invention.

Referring to FIG. 2, the size measurement apparatus 10 according to this embodiment has the shape of tights, and is formed from a material such as extensible fiber as a whole.

When the user wears the size measurement apparatus 10 on the lower part of his/her body as if wearing tights, the size measurement apparatus 10 extends in accordance with the size and shape of the lower part of the body of the user and measures its size and shape.

For example, the user wears the size measurement apparatus 10 such that the waist portion of the size measurement apparatus 10 is aligned with the position of the waist of the user, and the hem portion of the size measurement apparatus 10 is located slightly above the ankles of the user. This makes the size measurement apparatus 10 extend in the leg length direction in accordance with the body type of the user and also makes the size measurement apparatus 10 extend in the circumferential direction around the waist, hips, and legs of the user in accordance with the thicknesses and the like of the waist, hips, and legs.

When the user takes off the size measurement apparatus 10 from the lower part of the body as if taking off tights, the size measurement apparatus 10 restores to the original size and shape.

As shown in FIG. 2, the size measurement apparatus 10 includes a main body unit 1 formed from an extensible material into the shape of tights and a measurement processing unit 4 that executes measurement processing and the like with respect to the size and shape of the body of a user.

As an extensible material for the main body unit 1, for example, synthetic fiber or the like obtained by blending spandex (polyurethane elastic fiber) with a material with high extensibility and high elasticity, such as polyester, or another fiber (cotton or the like) is used. Alternatively, it is possible to use another type of material generally used for clothing and the like as long as the material can ensure extensibility and elasticity.

Referring to FIG. 2, the measurement processing unit 4 is attached to a position on the lining of the waist portion of the main body unit 1 in the shape of tights. This is merely an example, and the attachment position of the measurement processing unit 4 is not limited to this position.

Figure 3:
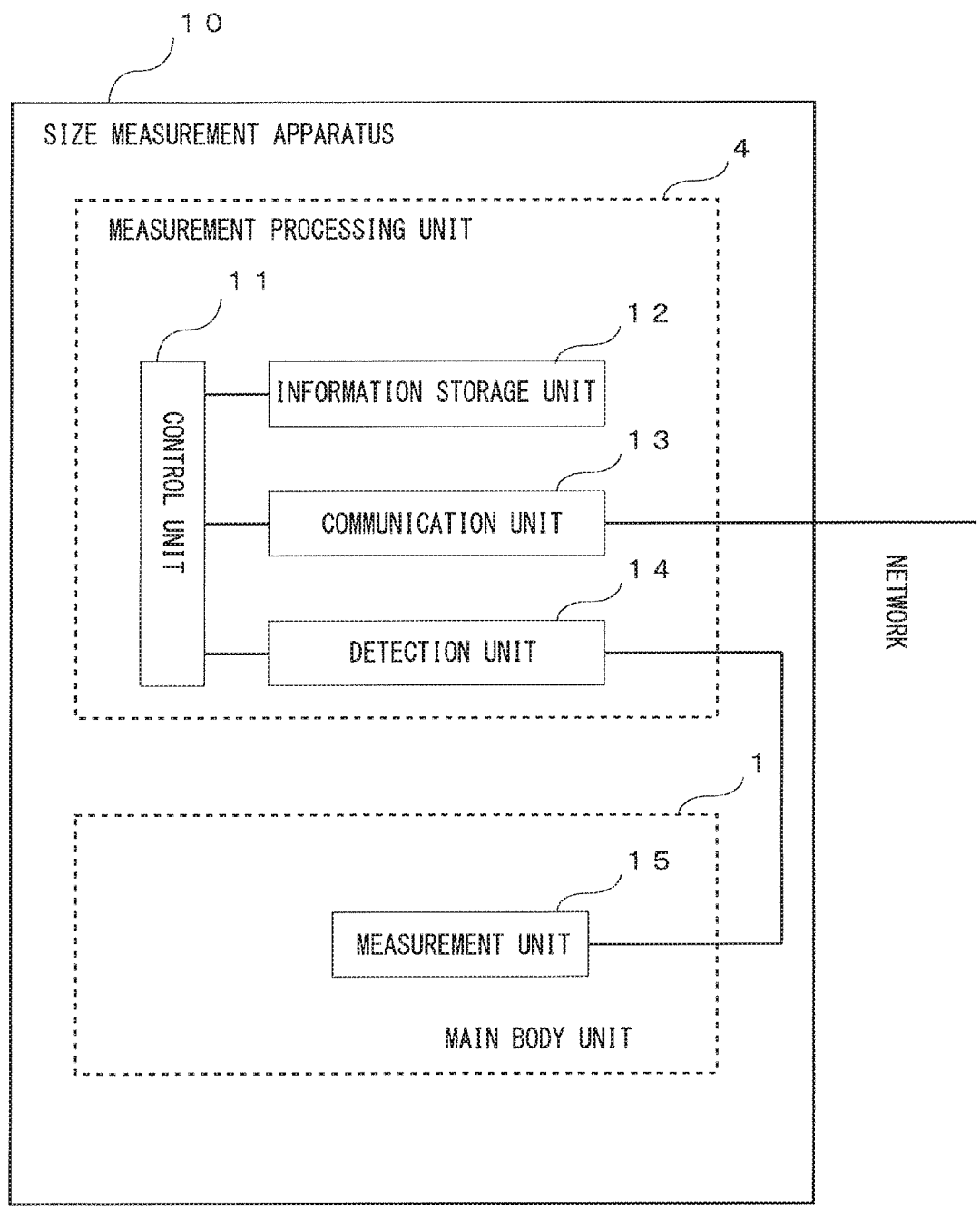
[FIG. 3]

FIG. 3 is a block diagram showing the arrangement of the size measurement apparatus 10 according to the first embodiment of the present invention.

As shown in FIG. 3, the measurement processing unit 4 of the size measurement apparatus 10 includes a control unit 11 that controls the overall size measurement apparatus 10 constituted by a CPU and the like, an information storage unit 12 that is constituted by a ROM, a RAM, and the like and stores sensor measurement information and the like, a communication unit 13 that communicates with the user terminal 20 via near field communication or the like, a detection unit 14 that detects measurement values obtained by measurement sensors (to be described later), and a measurement unit 15 constituted by one or more measurement sensors that measure the size, shape, and the like of the body of a user.

The detection unit 14 converts analog signals representing the size, shape, and the like of the body of the user measured by the measurement unit 15 (measurement sensors) into digital signals and inputs them to the control unit 11.

The measurement unit 15 is constituted by measurement sensors, which are provided on the main body unit 1 to measure physical change amounts based on changes in electric characteristic.

Arrangement of Measurement Sensor

FIG. 4 is a sectional schematic view showing an example of the arrangement of a measurement sensor 1200 according to the first embodiment of the present invention, in which (a) is a view showing a state in which the sensor has not extended, and (b) is a view showing a state in which the sensor has extended in a plane direction.

The arrangement of the measurement sensor 1200 used in the size measurement apparatus 10 according to this embodiment will be described below with reference to FIG. 4.

As shown in FIG. 4, the measurement sensor 1200 includes a dielectric film 1201 and electrodes 1202 and 1203 respectively fixed to the front and back surfaces of the dielectric film 1201.

The dielectric film 1201 is formed into a sheet-like shape so as to be elastically deformable.

The dielectric film 1201 is mainly formed from an elastomer as a material. As an elastomer, it is possible to use, for example, silicone rubber, acrylonitrile-butadiene copolymerized rubber, acrylic rubber, epichlorohydrin rubber, chlorosulfonated polyethylene, chlorinated polyethylene, or urethane rubber.

The electrodes 1202 and 1203 each are also formed into a sheet-like shape like the dielectric film 1201 so as to be elastically deformable.

The electrodes 1202 and 1203 each are mainly formed from an elastomer as a material. As an elastomer, it is possible to use, for example, silicone rubber, ethylene-propylene copolymerized rubber, natural rubber, styrene-butadiene copolymerized rubber, acrylonitrile-butadiene copolymerized rubber, acrylic rubber, epichlorohydrin rubber, chlorosulfonated polyethylene, chlorinated polyethylene, or urethane rubber.

The electrodes 1202 and 1203 each are formed by extensively providing a conductive material on the elastomer or making the elastomer contain the conductive material. This ensures the conductivity of the electrodes 1202 and 1203 even when they extend and contract together with the dielectric film 1201.

A capacitance C of the measurement sensor 1200 can be obtained by the following equation:

$$C = \varepsilon \cdot S/d \quad (1)$$

(C: capacitance, $\varepsilon$: dielectric ratio, S: area of electrode 1202 (electrode 1203), and d: distance between electrodes 1202 and 1203)

As indicated by (a) and (b) in FIG. 4, when, for example, a force is applied to the electrodes 1202 and 1203 of the measurement sensor 1200 in a direction to make them extend in the plane direction, the area S of each of the dielectric film 1201 and the electrodes 1202 and 1203 increases, and the thickness of the dielectric film 1201 decreases. This reduces the distance d between the electrodes 1202 and 1203. This change increases the capacitance C between the electrodes 1202 and 1203 according to equation (1) given above.

In this embodiment, when the user wears the size measurement apparatus 10, the extensible measurement sensor 1200 in the band-like shape described above is attached on the main body unit 1 so as to almost linearly extend in the band length direction.

One end of a wiring is connected to each of the electrodes 1202 and 1203, and the other end of the wiring is connected to the detection unit 14.

Upon receiving a detection signal from the measurement sensor 1200, the detection unit 14 stores the value of the detection signal in the information storage unit 12.

The amplitude of the waveform of this detection signal changes in accordance with the capacitance between the electrodes 1202 and 1203. Measuring the amplitude can therefore measure (calculate) the capacitance between the electrodes 1202 and 1203.

As described above, when the measurement sensor formed by sandwiching the dielectric film 1201 between the electrodes 1202 and 1203 extends in the plane direction, the capacitance changes. This sensor can therefore be used as an extensible measurement sensor that measures how much the measurement sensor has physically extended by measuring the change amount of the capacitance.

Although in this embodiment, the measurement sensor 1200 has a three-layer structure in which the dielectric film 1201 is placed between the two electrodes 1202 and 1203, the measurement sensor 1200 may have a structure constituted by three or more layers with a dielectric film being placed between each pair of electrodes, i.e., an electrode, a dielectric film, an electrode, a dielectric film, an electrode, . . . being stacked on each other.

In this arrangement as well, each electrode is connected to the detection unit 14 via a wiring.

Example of Positions of Measurement Sensors

As described above, the main body unit 1 of the size measurement apparatus 10 is provided with the extensible measurement sensors 1200.

Figure 5:
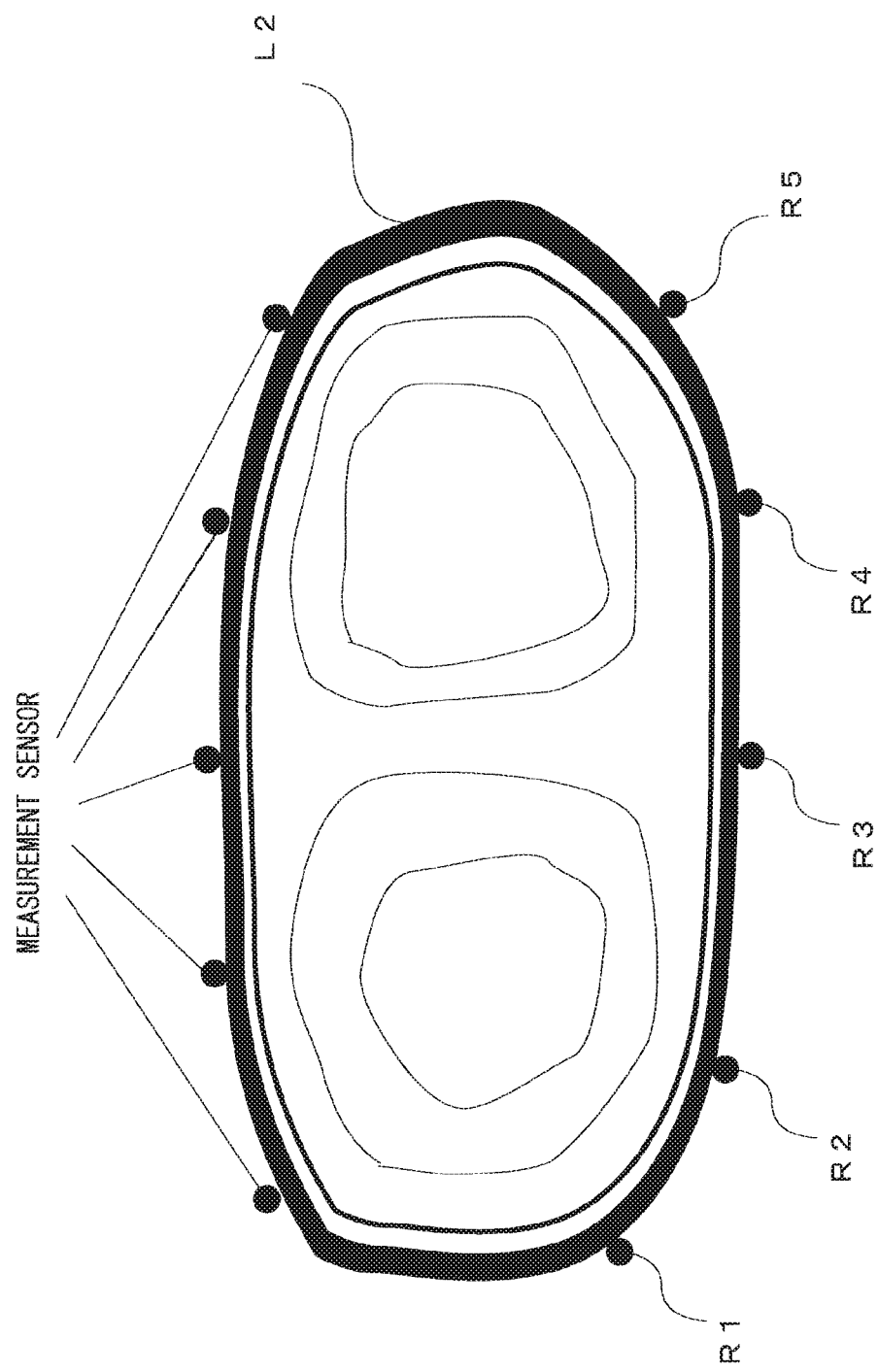
[FIG. 5]

FIG. 5 is a sectional plan view of the size measurement apparatus 10 taken along a line A-A of the front view of FIG. 2.

The positions and function/operation of the measurement sensors 1200 in the size measurement apparatus 10 will be described below with reference to FIGS. 2 and 5.

In each of the examples shown in FIGS. 2 and 5, in the main body unit 1 of the size measurement apparatus 10, measurement sensors L1 to L12 and R1 to R5 are vertically and horizontally arranged at predetermined intervals or random intervals so as to be orthogonal to each other in the shape of a lattice.

The measurement sensors L1 to L12 and R1 to R5 each have the same arrangement as that of the measurement sensor 1200 described above.

In this case, a longitudinal direction is a leg length direction, and a lateral direction is a circumferential direction around the waist, hips, legs, and the like and is perpendicular to the longitudinal direction.

The measurement sensors L1 to L12 and R1 to R5 are not directly electrically connected to each other, and the capacitance value of each measurement sensor is independently input to the detection unit 14.

As shown in FIG. 2, the measurement sensors R1 to R5 arranged in the longitudinal direction each are the band-like measurement sensor 1200, and are arranged from an upper end corresponding to a portion around the waist of the size measurement apparatus 10 in the shape of tights to a lower end corresponding to the hem portion (ankle portion).

FIG. 2 is a front view. On the back surface, the measurement sensors are also arranged in the longitudinal direction in the same manner.

As shown in FIG. 5, the measurement sensor L1 arranged in the lateral direction is formed into a ring-like shape by connecting the two ends of the band-like measurement sensor 1200 in the length direction to each other. The measurement sensor is attached to the main body unit 1 so as to be continuously wound around the waist of the size measurement apparatus 10 in the shape of tights by one turn from the front-surface side to the back-surface side.

Likewise, other measurement sensors, i.e., the measurement sensors L2 to L12 arranged in the lateral direction, each are formed from the measurement sensor 1200 in the shape of a ring. Each measurement sensor is attached to the main body unit 1 so as to be continuously wound around a corresponding region of the size measurement apparatus 10 in the shape of tights, such as the thigh or knee, by one turn.

In this manner, the band-like measurement sensors are arranged in the longitudinal direction of the size measurement apparatus 10, whereas the ring-like measurement sensors are arranged in the lateral direction. These band-like or ring-like measurement sensors each may be formed from one measurement sensor 1200 or a plurality of measurement sensors 1200 connected in series in the longitudinal direction of the measurement sensor.

When each measurement sensor is formed from a plurality of measurement sensors 1200, the management server 30 determines the overall length in the longitudinal direction or the lateral direction (circumferential direction) from the sum of the length values of the respective measurement sensors 1200.

The respective measurement sensors L1 to L12 and R1 to R5 may be attached to the front surface of the size measurement apparatus 10 so as to be exposed or may be attached to the back surface of the size measurement apparatus 10. Alternatively, when the main body unit 1 is formed from a plurality of fiber layers, these measurement sensors may be attached to the main body unit 1 so as to be sandwiched between the fiber layers.

Although not shown in FIG. 5, each of the measurement sensors L1 to L12 and R1 to R5 is connected to the detection unit 14 via a wiring. The control unit 11 calculates the capacitance value of each of the measurement sensors L1 to L12 and R1 to R5 by the same method as that described above.

When the user wears the size measurement apparatus 10 in the shape of tights, each of the measurement sensors L1 to L12 and R1 to R5 extends together with the main body unit 1 in accordance with the size of the user who has worn the size measurement apparatus 10.

Measuring the capacitances of the measurement sensors L1 to L12 and R1 to R5 when they extend can measure the length of each leg, the length around the waist of the user, and the like.

(3) Arrangement of User Terminal 20

The user terminal 20 is an information processing apparatus that the user operates to measure the size and shape of his/her own body, and is, for example, a smartphone, tablet type terminal, cellular phone, PDA, or PC.

Figure 6:
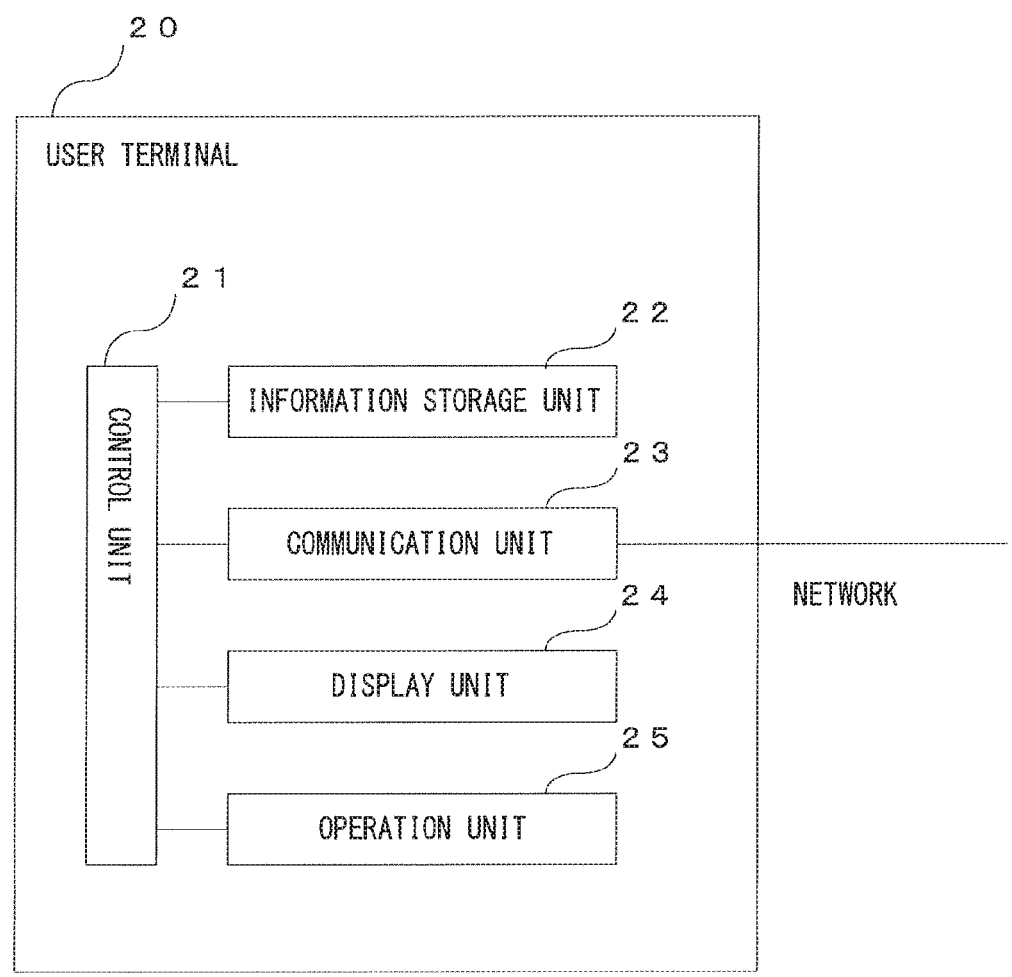
[FIG. 6]

FIG. 6 is a block diagram showing the arrangement of the user terminal 20 according to the first embodiment of the present invention.

As shown in FIG. 6, the user terminal 20 includes a control unit 21 that controls the overall user terminal 20 constituted by a CPU and the like, an information storage unit 22 that stores various types of information, a communication unit 23 that communicates with the management server 30 via a network such as the Internet or a LAN and also communicates with the size measurement apparatus 10 via near field communication such as a wireless LAN or Bluetooth (Registered trademark), a display unit 24 that displays information on a display or the like, and an operation unit 25 that inputs information with various keys, a touch panel, a microphone, and the like.

Although the user terminal 20 is preferably configured to transmit/receive information to/from the size measurement apparatus 10 via near field communication as described above, they may communicate with each other by mutually connecting a wiring (cable) to them.

Upon receiving sensor measurement information from the size measurement apparatus 10, the communication unit 23 transmits the received sensor measurement information to the management server 30.

Subsequently, when the communication unit 23 receives, from the management server 30, user size information as a result of measuring the body size of the user and information concerning apparel merchandise matching the body size of the user indicated by the user size information, the control unit 21 causes the display unit 24 to display these pieces of received information.

The user can directly purchase the merchandise via an online shop by operating the operation unit 25 concerning the merchandise search result information (Web page and the like) displayed on the display unit 24.

(4) Arrangement of Management Server 30

The management server 30 is an information processing apparatus that outputs and manages user size information including the size information of the body of the user based on the sensor measurement information transmitted from the user terminal 20, and provides the user size information to the user terminal 20.

The management server 30 also stores a plurality of pieces of merchandise information indicating the sizes and the like of apparel merchandise, searches for apparel merchandise matching the size and shape of the body of the user by referred to the merchandise information database based on the user size information, and provides the search result (merchandise search result information) to the user terminal 20.

Figure 7:
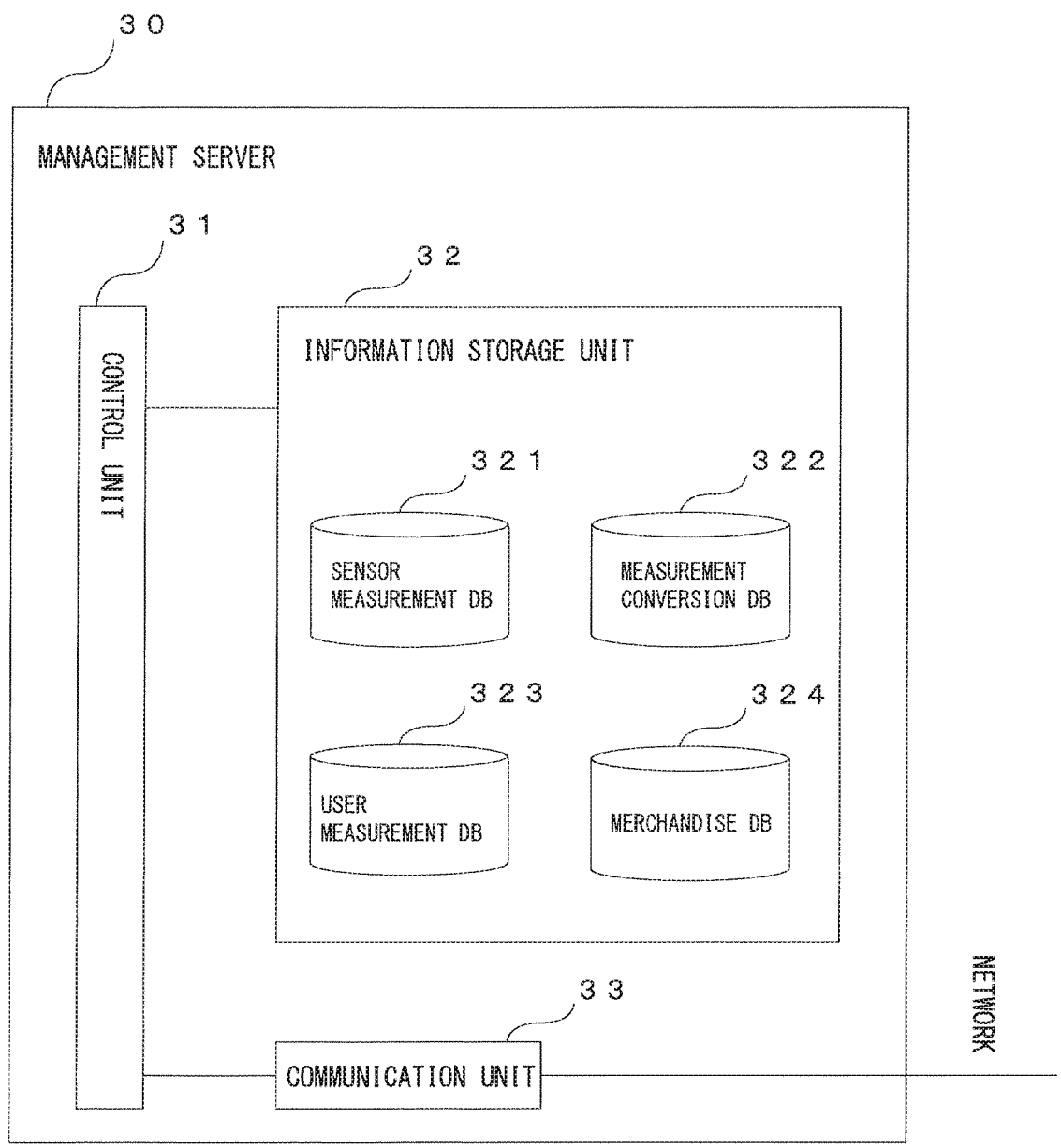
[FIG. 7]

FIG. 7 is a block diagram showing the arrangement of the management server 30 according to the first embodiment of the present invention.

As shown in FIG. 7, the management server 30 includes a control unit 31 that is constituted by a CPU and the like and controls the overall management server 30, an information storage unit 32 that stores sensor measurement information, merchandise information, and the like, and a communication unit 33 that communicates with the user terminal 20 via a network such as the Internet or a LAN.

The information storage unit 32 of the management server 30 stores a sensor measurement DB 321 that manages sensor measurement information representing the measurement values (capacitance values) of the respective measurement sensors measured by the size measurement apparatus 10, a measurement conversion DB 322 for converting sensor measurement information into sensor size information as the physical change amounts of the measurement sensors, a user measurement DB 323 as a database that manages the user size information of the respective users in correspondence with user IDs for identifying the users, and a merchandise DB 324 as a database that manages merchandise information representing the contents, sizes, and the like of apparel merchandise in correspondence with merchandise IDs for identifying the apparel merchandise.

The sensor measurement DB 321 is a database in which the management server 30 manages sensor measurement information (the capacitance values measured by the respective measurement sensors) received from the user terminal 20.

The sensor measurement DB 321 stores the capacitance values for the respective users and the respective measurement sensors.

The sensor measurement DB 321 stores sensor size information converted from the sensor measurement information, together with the above sensor measurement information, for each measurement sensor.

The measurement conversion DB 322 is a database for converting the capacitance values of the measurement sensors into length values.

The measurement conversion DB 322 manages the capacitance values of the measurement sensors L1 to L2 and R1 to R5 and the lengths of the measurement sensors L1 to L12 and R1 to R5 indicated by the capacitance values in correspondence with each other.

The measurement conversion DB 322 also manages sensor position information as information representing the positions of the respective measurement sensors in the size measurement apparatus 10.

Sensor position information is coordinate information representing a specific position of a measurement sensor in the size measurement apparatus 10 in the shape of, for example, tights.

The above sensor position information also includes information indicating the measurement values obtained by specific measurement sensors based on which the respective sizes represented by user size information are determined.

The respective sizes represented by the user size information indicate the sizes (corresponding to sizes Sz1 to Sz4, . . . (to be described later)) of the body parts of the user, such as the waist and hips.

For example, the measurement conversion DB 322 manages information indicating that "the size of the waist is determined by the sensor L1".

The respective sizes represented by user size information include not only a size determined by one measurement sensor but also a size determined a plurality of measurement sensors.

That is, the respective sizes represented by user size information include a size determined by the sum or difference of the measurement values obtained by a plurality of measurement sensors or their converted values.

Sensor position information also indicates that the respective sizes represented by these pieces of user size information are determined by the sums or differences of the measurement values obtained by specific measurement sensors.

Upon receiving sensor measurement information from the user terminal 20, the management server 30 converts the received sensor measurement information into sensor size information, and detects how much length the size of a specific part of the body of the user has based on the converted sensor size information (the length value of each measurement sensor) and the above sensor position information.

The user measurement DB 323 is a database that manages user size information representing the body sizes of each user.

FIG. 8 is a view showing an example of the data configuration of the user measurement DB 323 according to the first embodiment of the present invention.

As shown in FIG. 8, the user measurement DB 323 manages various sizes Sz1 to Sz4, . . . of the bodies of users, as user size information for the respective users.

Note that sizes Sz1 to Sz4, . . . are dimensions generally used when wearing clothing or the like to define, for example, the waist, hips, and inseam of a user. However, they are not exhaustive, and the above sizes include all body sizes.

The control unit 31 determines the above user size information based on sensor size information representing the lengths of the respective measurement sensors.

When the management server 30 receives sensor measurement information (the capacitance values of measurement sensors) from the user terminal 20, the control unit 31 of the management server 30 refers to the measurement conversion DB 322 to convert the received capacitance values into sensor size information representing the length values of measurement sensors.

This sensor size information is information representing the length of each measurement sensor.

As described above, the control unit 31 extracts sensor size information representing the lengths of some measurement sensors from the converted sensor size information, and registers, in the user measurement DB 323, the extracted sensor size information as user size information representing body size information such as the sizes of the waist, hips, and inseam of the user.

As described above, when the size of the body of a user is represented by the sum of the lengths of a plurality of measurement sensors, the control unit 31 totalizes the values of pieces of sensor size information of a plurality of measurement sensors extracted in the above manner, and registers the sum as user size information in the user measurement DB 323.

When the size of the body of a user is represented by the difference between the lengths of a plurality of measurement sensors, the control unit 31 calculates the difference between the values of pieces of sensor size information of a plurality of measurement sensors extracted in the above manner, and registers the calculated value as user size information in the user measurement DB 323.

The management server 30 transmits user size information registered in the user measurement DB 323 to the user terminal 20.

The merchandise DB 324 is a database that manages the merchandise information of apparel merchandise.

FIG. 9 is a view showing an example of the data configuration of the merchandise DB 324 according to the first embodiment of the present invention.

As shown in FIG. 9, the merchandise DB 324 registers merchandise size information representing the sizes of apparel merchandise measured by a predetermined method and other information concerning the apparel merchandise (the shapes, colors, designs, types, manufacturers, prices, and image information of apparel merchandise, the URLs of sales pages for the apparel merchandise in online shops, and the like) as merchandise information in association with merchandise IDs identifying the apparel merchandise.

FIG. 10 is a view showing in more detail merchandise size information of the data managed by the merchandise DB 324 according to the first embodiment of the present invention.

As shown in FIG. 10, the merchandise DB 324 registers the merchandise size information of each apparel merchandise for each of sizes Sz1 to Sz4, . . . (partially omitted in FIG. 10).

The sizes Sz1 to Sz4, . . . of the above merchandise size information respectively correspond to the sizes Sz1 to Sz4, . . . in the user measurement DB 323.

The merchandise DB 324 also registers a search range for each merchandise size information. Each search range includes the numerical values of the corresponding merchandise size information.

Referring to the example shown in FIG. 10, the merchandise size information of size Sz1 of apparel merchandise corresponding to merchandise ID "S0001" is "72.0", and the corresponding search range is "70.0 to 75.0" in the brackets. When the user size information is "72.0", because the user size information falls within the search range, the control unit 31 of the management server 30 determines that information concerning the apparel merchandise corresponding to merchandise ID "S0001" can be included in the merchandise search result information provided to the user terminal 20.

The control unit 31 performs the above search processing for each of sizes Sz1 to Sz4, . . . of each apparel merchandise, and extracts merchandise information concerning the apparel merchandise matching the body size of the user.

Note that an extraction method for the above apparel merchandise is not specifically limited.

For example, only when user size information falls within the search ranges of all sizes Sz1 to Sz4, . . . , merchandise information concerning the apparel merchandise may be extracted. Alternatively, when user size information falls within the search ranges of some measurement sensors described above, merchandise information may be extracted.

The user may set arbitrary values as numerical value widths of search ranges in advance and registers them in the merchandise DB 324 in advance. Alternatively, the control unit 31 of the management server 30 may automatically set the numerical value widths of search ranges in accordance with the type, material, and the like of each apparel merchandise.

For example, the control unit 31 may set relatively wide numeral value widths of search ranges for apparel merchandise made of a material with high extensibility, and may set relatively narrow numeral value widths of search ranges for apparel merchandise made of a material with low extensibility.

The control unit 31 transmits, as merchandise search result information, merchandise information concerning one or more pieces of apparel merchandise extracted as a result of performing a search in the above manner to the user terminal 20.

Upon receiving merchandise search result information from the management server 30, the user terminal 20 displays the received merchandise search result information on the display unit 24.

In this case, as merchandise search result information, for example, various types of characters and image information concerning apparel merchandise matching the body size and shape of the user indicated by the user size information or apparel merchandise having a size and shape that are close to values in predetermined value ranges are displayed.

The user can know information concerning apparel merchandise matching the body of the user himself/herself by browsing the displayed merchandise search result information, and can use the information as a reference when purchasing apparel merchandise.

When, for example, the user clicks on a URL displayed on merchandise search result information, the user terminal 20 transmits a request to acquire a Web page corresponding to the URL to the Web server. The Web server transmits a purchase page for apparel merchandise on the merchandise search result information as the Web page to the user terminal 20.

Upon receiving the purchase page, the user terminal 20 displays the page on the display unit 24.

Subsequently, the user can purchase the corresponding apparel merchandise via the purchase page in an online shop. Purchasing processing in the online shop is the same as known processing details, and hence a description of the processing will be omitted.

[3] Operation of First Embodiment

A measuring operation for the size or the like of a user by the size measurement system according to the first embodiment of the present invention will be described next.

Figure 11:
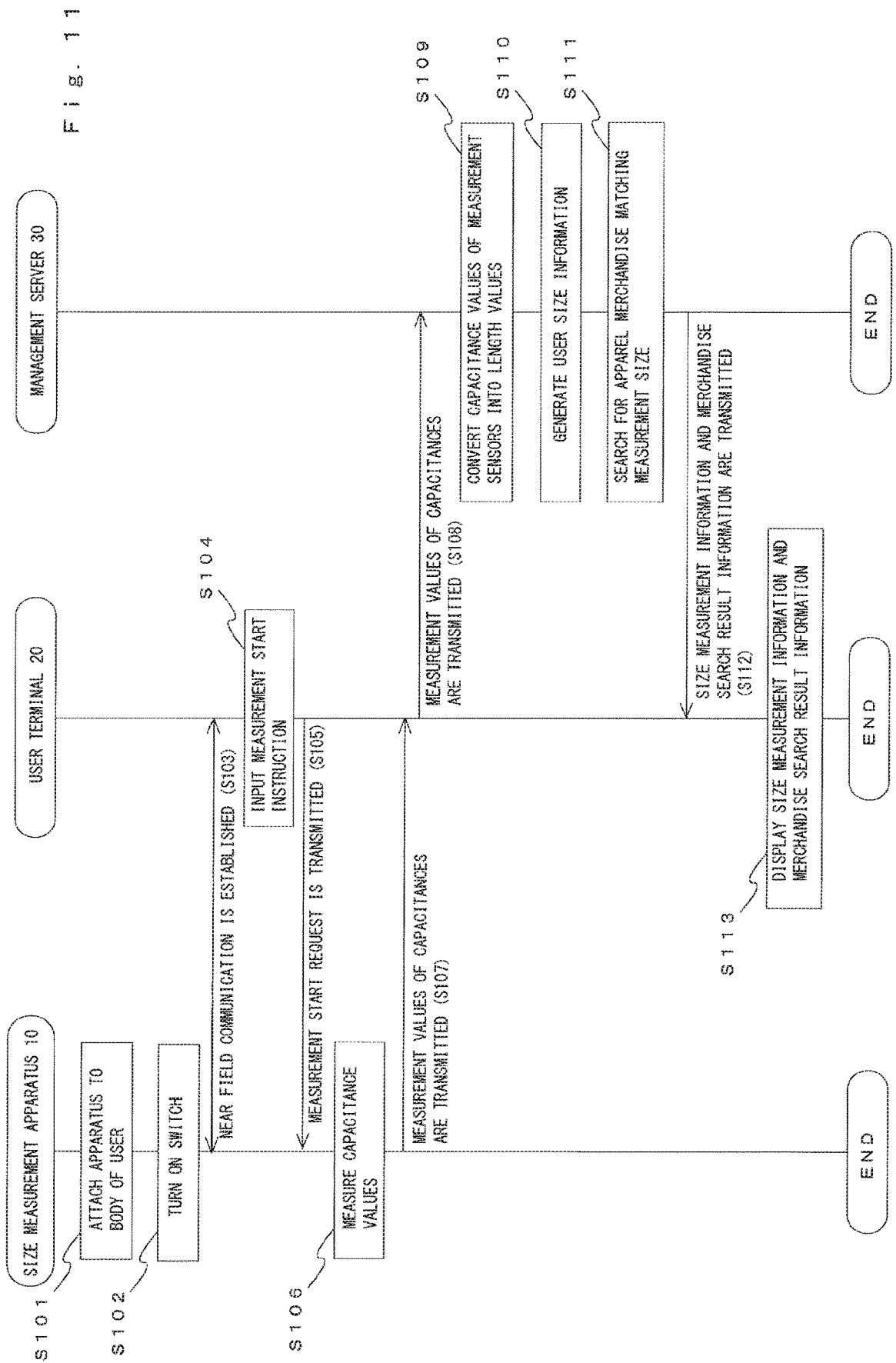
[FIG. 11]

FIG. 11 is a sequence chart showing a procedure for a measuring operation for the size or the like of the body of a user by the size measurement system according to the first embodiment of the present invention.

This measuring operation will be described along with FIG. 11.

First of all, the user wears the size measurement apparatus 10 in the shape of tights on the lower part of his/her body (step S101).

The user then operates a predetermined switch (not shown) of the size measurement apparatus 10 to turn on the switch (step S102). Near field communication is established between the size measurement apparatus 10 and the user terminal 20 (step S103).

Because a known technique is used as a method of establishing this near field communication, a detailed description of the method will be omitted.

When near field communication is established between the size measurement apparatus 10 and the user terminal 20, the user then operates the operation unit 25 of the user terminal 20 to input a measurement start instruction (step S104).

The user terminal 20 then transmits a measurement start request to the size measurement apparatus 10 (step S105).

Upon receiving the above measurement start request from the user terminal 20, the size measurement apparatus 10 measures the capacitance value of the measurement sensors L1 to L12 and R1 to R5 while the user wears the size measurement apparatus 10 (step S106), and transmits the measurement values as sensor measurement information to the user terminal 20 (step S107).

Upon receiving the above sensor measurement information (the measurement values of the capacitances), the user terminal 20 transmits the received sensor measurement information to the management server 30 (step S108).

When the management server 30 receives the above sensor measurement information from the user terminal 20, the control unit 31 of the management server 30 registers the received sensor measurement information in the sensor measurement DB 321, and also converts, based on the measurement conversion DB 322, the received sensor measurement information into sensor size information representing the length values of the measurement sensors L1 to L12 and R1 to R5 when the user has worn the size measurement apparatus 10 (step S109).

The management server 30 registers the sensor size information representing the converted length values in the sensor measurement DB 321.

The control unit 31 then generates user size information based on the above converted sensor size information and the above sensor position information, and registers the generated user size information in the user measurement DB 323 (step S110).

The control unit 31 then refers to the merchandise DB 324 to search for apparel merchandise matching the generated user size information (the body size of the user) (step S111).

The management server 30 then transmits merchandise search result information indicating the search result to the user terminal 20 (step S112).

Upon receiving the merchandise search result information, the user terminal 20 displays the information on the display unit 24 (step S113).

For example, the display unit 24 of the user terminal 20 displays, as the contents of the merchandise search result information, detailed information such as a list of apparel merchandise corresponding to user size information matching values in search ranges, prices, manufacturers, an images.

The URL of a Web page of an online shop for the purchase of displayed apparel merchandise may be embedded in merchandise search result information so that when, for example, the user clicks on an icon or URL on the merchandise search result information, the user terminal 20 transmits a request to acquire a Web page for the purchase of the apparel merchandise to the Web server (or the management server 30) and displays the corresponding page upon receiving it from the Web server, thereby allowing the user to purchase the apparel merchandise on the online shop.

The operation is then terminated.

[4] Summary of First Embodiment

As described above, the size measurement system according to the first embodiment of the present invention allows the user to specify the size and shape of the body of the user based on the change amounts or the like of the capacitances of the measurement sensors L1 to L12 and R1 to R5 by only performing the simple operation of wearing the size measurement apparatus 10 on his/her body as if wearing tights. This makes it possible to easily check the size and shape of the body or search for apparel merchandise matching the size and shape of the body.

The measurement sensors L1 to L12 and R1 to R5 of the size measurement apparatus 10 each are formed from an extensible material. When the user takes off the size measurement apparatus 10 as if taking off tights, the shape of the apparatus is restored. This makes it possible to repeatedly measure the size and the like of the body.

[5] First Modification of First embodiment

Management of Measurement Conversion DB by User Terminal 20

(1) Arrangement of First Modification of First Embodiment

In the first embodiment described above, the management server 30 manages the measurement conversion DB 322 associating sensor measurement information (the measurement values of the capacitances) with sensor size information (lengths), and converts the capacitance values of measurement sensors into lengths.

In this modification, the user terminal 20 manages the above measurement conversion DB in place of the management server 30.

Although the first modification of the first embodiment will be described in detail below, the arrangement, operation, and the like of the first modification are the same as those of the first embodiment unless specified otherwise.

(2) Operation of First Modification of First Embodiment

In this modification, upon receiving sensor measurement information from the size measurement apparatus 10, the user terminal 20 generates sensor size information by converting the capacitance values of the respective measurement sensors, included in the sensor measurement information, into length values, based on the measurement conversion DB stored in the own terminal.

The user terminal 20 then generates user size information, based on the generated sensor size information, and displays the information on the display unit 24.

The user terminal 20 transmits the generated user size information to the management server 30.

When the management server 30 receives the user size information from the user terminal 20, the control unit 31 of the management server 30 performs apparel merchandise search processing based on the received user size information.

The contents of the apparel merchandise search processing and subsequent processing are the same as those in the first embodiment described above, and hence a description of the contents will be omitted.

(3) Summary of First Modification of First Embodiment

As described above, in this modification, the user terminal 20 stores the measurement conversion DB in place of the management server 30, outputs user size information to the user, and displays the information. This makes it possible to reduce the load of processing by the management server 30.

[6] Second Modification of First Embodiment

Another Shape of Size Measurement Apparatus 10

(1) Arrangement of Second Modification of First Embodiment

In the first embodiment described above, the size measurement apparatus 10 has the shape of tights. In the second modification, the size measurement apparatus 10 has the shape of clothing other than tights.

FIGS. 12(*a*) and 12(*b*) are views each showing the outer appearance of the size measurement apparatus 10 according to a modification of the first embodiment of the present invention.

This modification will be described below with reference to FIGS. 12(*a*) and 12(*b*).

As shown in FIG. 12(*a*), the size measurement apparatus 10 may have the shape of a shirt.

The size measurement apparatus 10 has a plurality of measurement sensors arranged in the shape of a lattice like the size measurement apparatus 10 having the shape of tights. For example, band-like measurement sensors are used as the measurement sensors in the longitudinal direction, whereas ring-like measurement sensors are arranged around the aims, waist, neck, and the like.

When the user wears the size measurement apparatus 10 in the shape of a shirt on the upper part of his/her body as if wearing a shirt, the size of the upper part of the body is measured.

As shown in FIG. 12(b), the size measurement apparatus 10 may have the shape of a cap.

The size measurement apparatus 10 has a plurality of measurement sensors arranged in the shape of a lattice like the size measurement apparatus 10 in the shape of tights or shirt. For example, band-like measurement sensors are used as measurement sensors in the longitudinal direction, whereas ring-like measurement sensors are used as measurement sensors around the head or the like.

When the user wears the size measurement apparatus 10 in the shape of a cap on his/her head as if wearing a cap, the size of the head is measured.

(2) Summary of Second Modification of First Embodiment

As described above, even the size measurement apparatus 10 having a shape other than the shape of tights, for example, the shape of clothing associated with the body of the user, enables to easily measure the body size and body shape of the user.

Note that the measurement method is the same as that according to the first embodiment, and hence a description of the method will be omitted.

[7] Third Modification of First Embodiment

Measurement of Electric Resistance Values of Measurement Sensors

(1) Outline of Third Modification of First Embodiment

In the first embodiment, the size measurement apparatus 10 is configured to measure the degree of extension of each measurement sensor based on a change in the capacitance of the measurement sensor.

In contrast to this, the size measurement apparatus 10 according to the third modification of the first embodiment is configured to specify the size and shape of the body of the user by measuring the extension/contraction of each measurement sensor based on a change in characteristic other than the capacitance of the measurement sensor, especially a change in electric resistance value.

The third modification of the first embodiment will be described below, assuming that the modification is the same as the first embodiment unless specified otherwise.

(2) Arrangement of Third Modification of First Embodiment

Arrangement of Measurement Sensor

In this modification, each measurement sensor includes synthetic fiber having extensibility obtained by blending conductive fiber with non-conductive fiber and a measurement device that measures a resistance value across two ends of the synthetic fiber in the extension/contraction direction (distance measurement direction) of the synthetic fiber.

The conductive fiber includes, for example, carbon fiber, metal fiber (silver, copper, aluminum, or the like), conductive polymer fiber including fiber formed from a conductive polymer or conductive material (conductive filler), metal coating fiber (silver, copper, aluminum, or the like), or a mixture of them.

The non-conductive fiber includes, for example, polyester-based fiber, polyurethane-based fiber, polyamide-based fiber, or cotton.

Note that fiber including metal coating fiber or conductive material (conductive filler) may be used alone without being blended with non-conductive fiber.

When a tensile force is applied to the measurement sensor to make it extend in the extension/contraction direction, the length of the measurement sensor itself increases, and its cross-sectional area in a direction perpendicular to the extension direction decreases. As a result, the electric resistance increases.

Arrangement of Management Server 30

In the first embodiment, the management server 30 stores the measurement conversion DB 322, which manages the capacitance values of measurement sensors and the length values of the measurement sensors in correspondence with each other.

In contrast to this, in this modification, the measurement conversion DB 322 manages the electric resistance values of the measurement sensors and the length values of the measurement sensors in correspondence with each other.

Upon receiving sensor measurement information including the electric resistance values of the measurement sensors from the user terminal 20, the management server 30 refers to the measurement conversion DB 322 to convert the received electric resistance values of the measurement sensors into length values, generates user size information based on sensor size information including the length values of the measurement sensors, and transmits the generated information to the user terminal 20.

The management server 30 also transmits merchandise search result information generated based on the user size information to the user terminal 20.

(3) Operation of Third Modification of First Embodiment

In the measurement device described above, when the user wears the size measurement apparatus 10 and the synthetic fiber extends, contact portions of conductive fiber portions separate from each other, and the resistance value of the synthetic fiber increases. Measuring this increase amount with the measurement sensor makes it possible to specify the degree of extension of the synthetic fiber.

The size measurement apparatus 10 transmits the measured electric resistance value of the synthetic fiber as sensor measurement information to the user terminal 20.

Upon receiving the sensor measurement information (electric resistance value), the user terminal 20 transmits the received sensor measurement information to the management server 30.

Upon receiving the above sensor measurement information from the user terminal 20, the management server 30 refers to the measurement conversion DB 322 to convert the electric resistance value of the measurement sensor included in the received sensor measurement information into the length value of the synthetic fiber, and generates sensor size information.

The management server 30 generates user size information based on the sensor size information including the length value of the synthetic fiber, and transmits the generated information to the user terminal 20.

Upon receiving the user size information from the management server 30, the user terminal 20 displays the body size of the user based on the received user size information and the sensor position information stored in the information storage unit 22.

(4) Summary of Third Modification of First Embodiment

As described above, the size measurement system according to the third modification of the first embodiment of the present invention measures the electric resistance value of each measurement sensor and detects the length of the synthetic fiber of the measurement sensor, and hence can easily specify the size and shape of the body of the user as in the case of measuring the capacitance value of each measurement sensor.

Note that the size measurement apparatus 10 may be configured to specify the size and shape of the body of the user by measuring the extension/contraction of each measurement sensor based on a change in characteristic (especially electric characteristic) other than an electric resistance value.

In this modification, as in the first embodiment configured to measure the capacitance of each measurement sensor, a plurality of measurement sensors may be connected in series and arranged on the size measurement apparatus 10.

In this modification, as in the first embodiment configured to measure the capacitance of each measurement sensor, each size of user size information may also be the sum or difference of lengths determined from the electric capacitance values of a plurality of measurement sensors.

Second Embodiment

[1] Outline of Second Embodiment

In the first embodiment, the respective measurement sensors are arranged at predetermined intervals or randomly in the shape of a lattice.

In contrast to this, in the second embodiment of the present invention, when clothing is tailored or the user purchases clothing, measurement sensors are arranged at arbitrary positions corresponding to typical dimensions of the body or clothing to be measured, such as the waist, hips, and rise.

This embodiment will be described below, assuming that the embodiment is the same as the first embodiment unless specified otherwise.

[2] Arrangement of Second Embodiment

(1) Arrangement of Size Measurement Apparatus 10

Arrangement of Measurement Sensor

Figure 13:
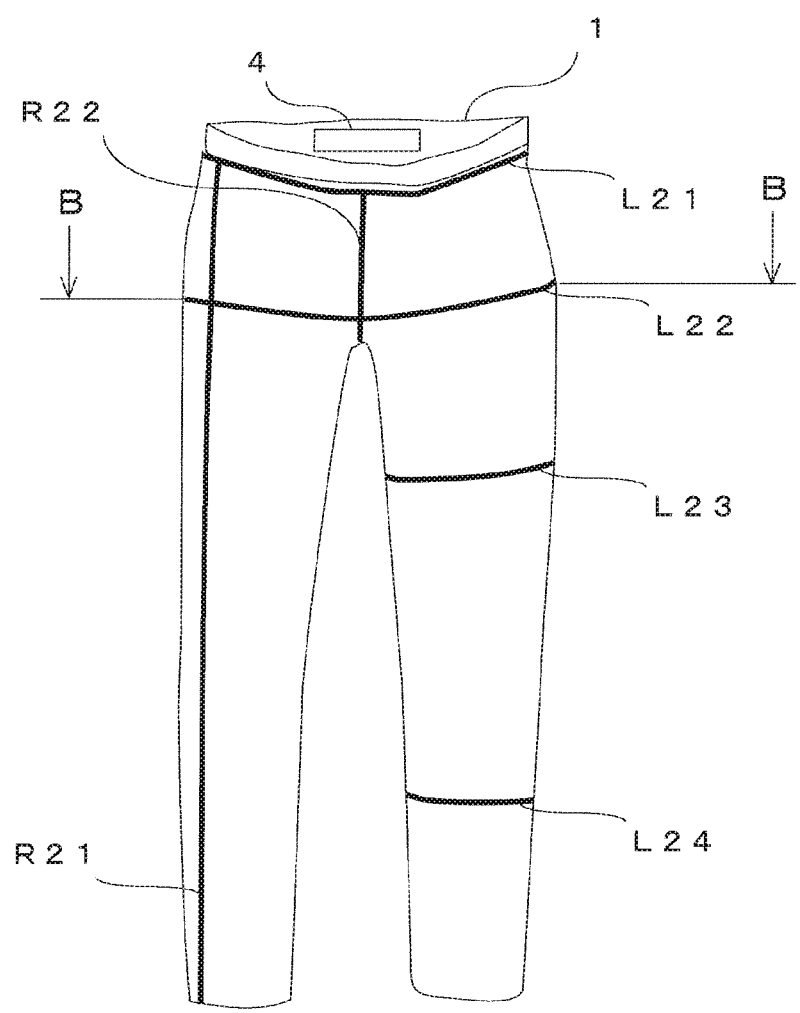
[FIG. 13]

FIG. 13 is a front view showing the outer appearance of a size measurement apparatus 10 according to the second embodiment of the present invention.

As shown in FIG. 13, the size measurement apparatus 10 includes a main body unit 1 formed into the shape of tights by using an extensible material and a measurement processing unit 4 that executes measurement processing and the like for the size and shape of the body of the user.

Example of Arrangement of Measurement Sensor

As described above, the main body unit 1 of the size measurement apparatus 10 is provided with extensible type measurement sensors 1200.

Figure 14:
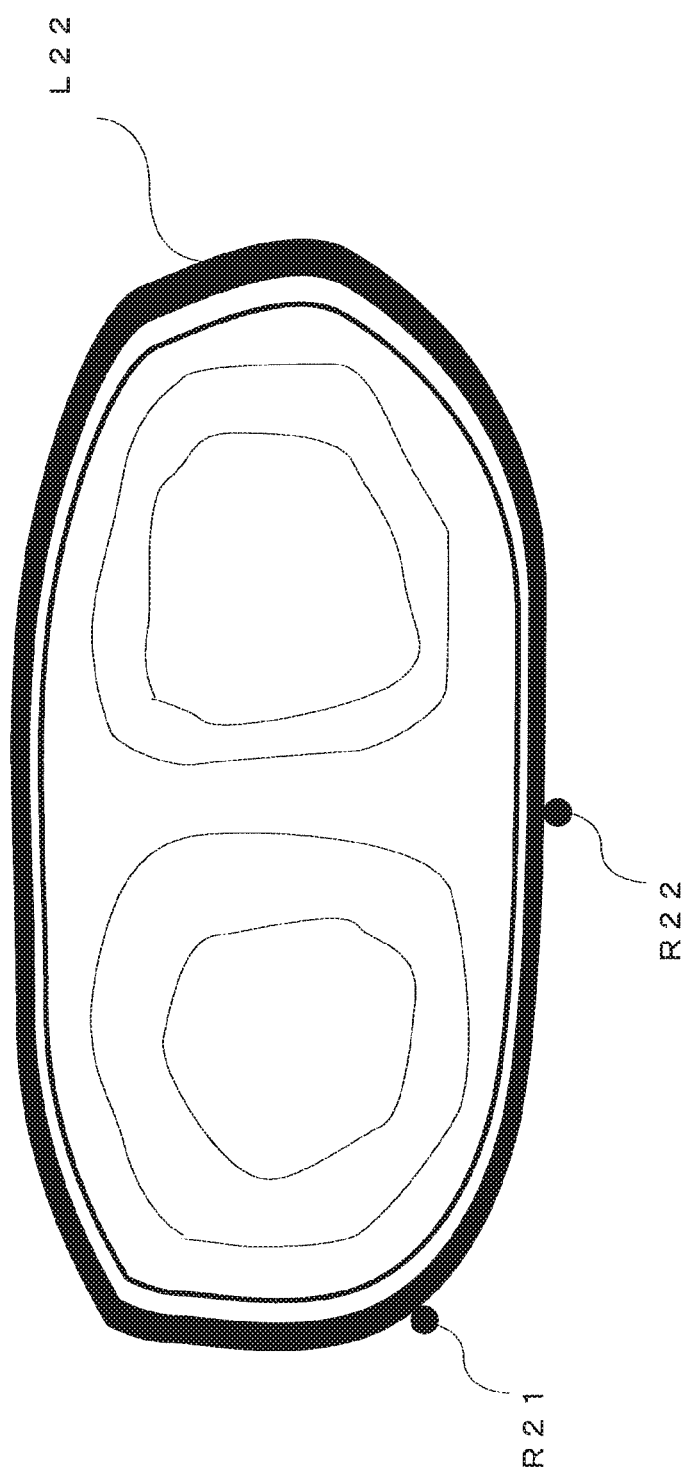
[FIG. 14]

FIG. 14 is a sectional plan view of the size measurement apparatus 10 taken along a line B-B of the front view of FIG. 13.

The positions and function/operation of the measurement sensors 1200 in the size measurement apparatus 10 will be described below with reference to FIGS. 13 and 14.

In the case shown FIGS. 13 and 14, the main body unit 1 of the size measurement apparatus 10 has measurement sensors L21 to L23, R21, and R22 arranged vertically and horizontally at arbitrary intervals to be substantially perpendicular to each other so as to measure lengths at positions corresponding to typical dimensions.

Each of the measurement sensors L21 to L24, R21, and R22 has the same arrangement as that of the measurement sensor 1200.

In this case, a longitudinal direction is a leg length direction, and a lateral direction is a direction perpendicular to the longitudinal direction.

The measurement sensors L21 to L24, R21, and R22 are not directly electrically connected to each other, and the capacitance value of each measurement sensor is independently input to a detection unit 14.

As shown in FIG. 13, the measurement sensors R21 and R22 arranged in the longitudinal direction each are the band-like measurement sensor 1200.

In the case shown in FIG. 13, the measurement sensor R21 is arranged from an upper end corresponding to a portion around the waist of the size measurement apparatus 10 to a lower end corresponding to the hem portion (ankle portion).

The measurement sensor R22 is arranged at a position corresponding to the rise. Although FIG. 13 is a front view, the measurement sensors are also arranged on the back surface in the longitudinal direction.

As shown in FIG. 14, the measurement sensor L21 arranged in the lateral direction is formed into a ring by connecting the two ends of the band-like measurement sensor 1200 in the length direction to each other. The measurement sensor is attached to the main body unit 1 so as to be continuously wound around the waist of the size measurement apparatus 10 in the shape of tights by one turn from the front-surface side to the back-surface side.

Likewise, other measurement sensors, i.e., the measurement sensors L22 to L24 arranged in the lateral direction, each are formed from the measurement sensor 1200 in the shape of a ring. Each measurement sensor is attached to the main body unit 1 so as to be continuously wound around a corresponding region of the size measurement apparatus 10 in the shape of tights by one turn.

The measurement sensors L22, L23, and L24 are respectively wound around the hips, thighs, and calves.

The respective measurement sensors L21 to L24, R21, and R22 may be attached to the front surface of the size measurement apparatus 10 so as to be exposed or may be attached to the back surface of the size measurement apparatus 10. Alternatively, when the main body unit 1 is formed from a plurality of fiber layers, these measurement sensors may be attached to the main body unit 1 so as to be sandwiched between the fiber layers.

Although not shown in FIG. 14, each of the measurement sensors L21 to L24, R21, and R22 is connected to the detection unit 14 via a wiring. The control unit 11 calculate the capacitance value of each of the measurement sensors L21 to L24, R21, and R22 by the same method as that described above.

When the user wears the size measurement apparatus 10 in the shape of tights, each of the measurement sensors L21 to L24, R21, and R22 extends together with the main body unit 1 in accordance with the size of the user who has worn the size measurement apparatus 10.

Measuring the capacitances of the measurement sensors L21 to L24, R21, and R22 when they extend can measure the length of each leg and the lengths around the waist and the like of the user.

[3] Summary of Second Embodiment

As described above, the size measurement system according to the second embodiment of the present invention has the measurement sensors arranged at positions at which the sizes of portions (waist, hips, and the like) to which the user refers when purchasing apparel merchandise can be measured, and hence facilitates selection of apparel merchandise with the simple arrangement when the user purchases apparel merchandise.

In this embodiment, the size measurement apparatus 10 has the shape of tights. However, this is not exhaustive. For example, this apparatus may have another shape such as a shirt or cap as in the second modification of the first embodiment.

When this apparatus has the shape of a shirt, cap, or the like, measurement sensors are arranged at arbitrary positions corresponding to typical dimensions of the body or clothing as in the case where the apparatus has the shape of tights.

In this embodiment, measurement sensors are arranged around the waist, hips, and the like. However, this is not exhaustive, as long as measurement sensors are arranged at arbitrary portions.

For example, the dimensions of the body or clothing which are usually measured include neck size, shoulder width, bust, under bust, arm, wrist, arm length, body length, cervical to knee, waist, hips, thigh, calf, ankle, inseam, and leg length.

The measurement conversion DB may be managed by a user terminal 20 or a management server 30.

Each measurement sensor may be configured to measure a capacitance value, electric resistance value, or another electric characteristic.

Third Embodiment

[1] Outline of Third Embodiment

In the first and second embodiments, each measurement sensor is formed into a band-like shape or ring-like shape in accordance with a direction in which electrodes, a dielectric film, and the like are arranged, and is wound around the waist or the like.

In contrast to this, in the third embodiment of the present invention, part of the band-like or ring-like portion of each measurement sensor is formed from a non-extensible material.

This embodiment will be described below, assuming that the embodiment is the same as the first embodiment unless specified otherwise.

[2] Arrangement of Third Embodiment (1) Arrangement of Size Measurement Apparatus 10

Arrangement of Measurement Sensor

Figure 15:
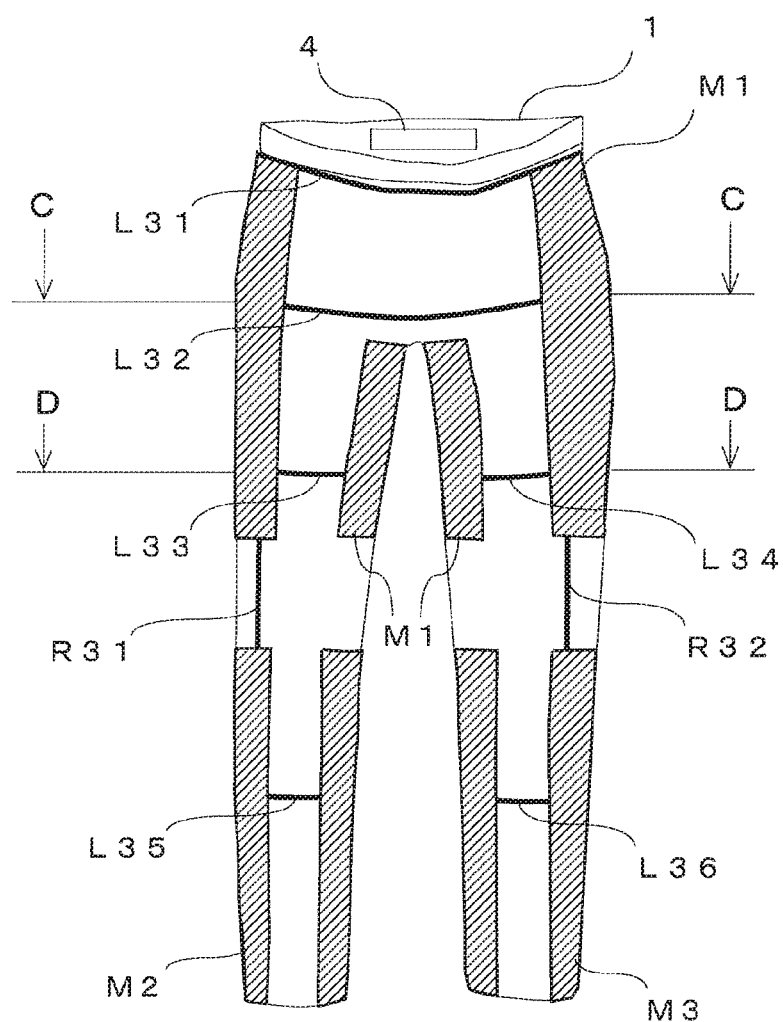
[FIG. 15]

FIG. 15 is a front view showing the outer appearance of the size measurement apparatus 10 according to the third embodiment of the present invention.

As shown in FIG. 15, the size measurement apparatus 10 includes a main body unit 1 formed from an extensible material into the shape of tights and a measurement processing unit 4 that executes measurement processing and the like with respect to the size and shape of the body of a user.

A measurement unit 5 of the measurement processing unit 4 has a non-extensible portion (to be described later) in addition to a measurement sensor.

Example of Positions of Measurement Sensors

As described above, the main body unit 1 of the size measurement apparatus 10 is provided with extensible-type measurement sensors 1200.

Figure 16:
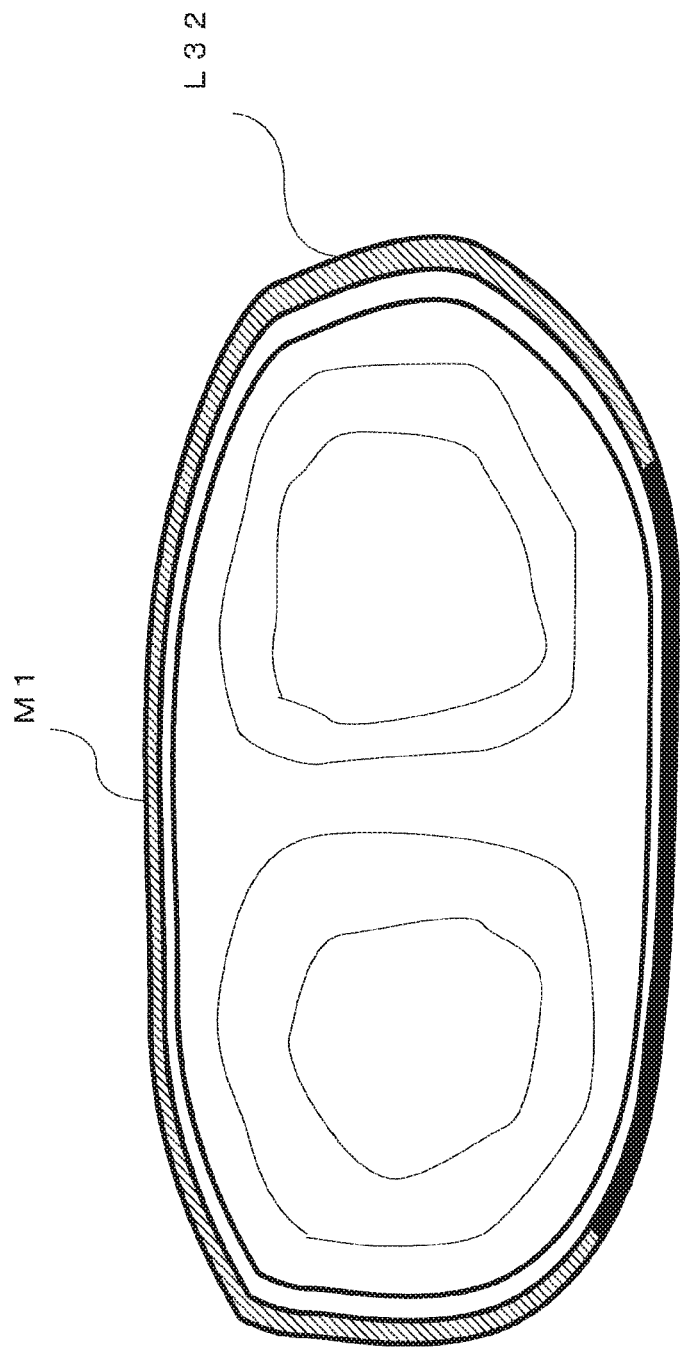
[FIG. 16]

FIG. 16 is a sectional plan view of the size measurement apparatus 10 taken along a line C-C of the front view of FIG. 15. FIG. 17 is a sectional plan view of the size measurement apparatus 10 taken along a line D - D of the front view of FIG. 15.

The positions and function/operation of the measurement sensors 1200 in the size measurement apparatus 10 will be described below with reference to FIGS. 15 to 17.

In the case shown in FIGS. 15 to 17, the main body unit 1 of the size measurement apparatus 10 has measurement sensors L31 to L36, R31, and R32 arranged vertically and horizontally at predetermined or arbitrary intervals to be substantially perpendicular to each other.

Each of the measurement sensors L31 to L36, R31, and R32 has the same arrangement as that of the measurement sensor 1200.

In this case, a longitudinal direction is a leg length direction, and a lateral direction is a direction perpendicular to the longitudinal direction.

The measurement sensors L31 to L36, R31, and R32 are not directly electrically connected to each other, and the capacitance value of each measurement sensor is independently input to a detection unit 14.

As shown in FIGS. 15 to 17, the main body unit 1 is provided with non-extensible portions M1 to M3, each formed from a non-extensible material, in addition to the measurement sensors L31 to L36, R31, and R32.

The non-extensible portion M1 is formed into a band-like shape and continuously wound around the main body unit 1 from the right end on the front-surface side to the left end on the front-surface side across the back-surface side.

The two ends of the non-extensible portion M1 in a band length direction (winding direction or lateral direction) are connected to the two ends of each of the measurement sensors L31 and L32 in the winding direction.

Portions of end portions of the non-extensible portion M1 in the band length direction are continuously wound around thigh portions from the right and left outer ends of the thighs to right and left thigh inner portions across the back-surface side. The right thigh outer end portion and the right thigh inner portion of the non-extensible portion M1 are connected to the two ends of the measurement sensor L33 in the lateral direction. The left thigh outer end portion and the left thigh inner portion of the non-extensible portion M1 are connected to the two ends of the measurement sensor L34 in the lateral direction.

The lower ends of the non-extensible portion M1 in the band width direction (the direction perpendicular to the band length direction or the longitudinal direction) are connected to the upper ends of the measurement sensors R31 and R32.

The non-extensible portion M2 is formed into a band-like shape and continuously wound around the right leg portion from the right end on the front-surface side of the main body unit 1 to the left end on the front-surface side across the back-surface side.

The two ends of the non-extensible portion M2 in the band length direction (the winding direction or the lateral direction) are connected to the two ends of the measurement sensor L35 in the winding direction.

The upper end of the non-extensible portion M2 in the band width direction (the leg length direction) is connected to the lower end of the measurement sensor R31.

The non-extensible portion M3 is formed into a band-like shape and continuously wound around the left leg portion from the right end on the front-surface side of the main body unit 1 to the left end on the front-surface side across the back-surface side.

The two ends of the non-extensible portion M3 in the band length direction (the winding direction or the lateral direction) are connected to the two ends of the measurement sensor L36 in the winding direction.

The upper end of the non-extensible portion M3 in the band width direction (the leg length direction) is connected to the lower end of the measurement sensor R32.

As shown in FIGS. 15 to 17, the measurement sensors R31 and R32 arranged in the longitudinal direction each are the band-like measurement sensor 1200.

In the case shown in FIGS. 15 to 17, the measurement sensors R31 and R32 are arranged on those portions of the size measurement apparatus 10 in the shape of tights which correspond to the knee portions.

As described above, the upper ends of the band-like measurement sensors R31 and R32 are connected to the lower ends of the non-extensible portion Ml, and the lower ends of the measurement sensors R31 and R32 are respectively connected to the upper ends of the non-extensible portions M2 and M3.

Because portions of the size measurement apparatus 10 in the longitudinal direction are formed from the non-extensible portions M1 to M3 in the above manner, when the user wears the size measurement apparatus 10 on the lower part of the body as if wearing tights, only the portions of the measurement sensors R31 and R32 extend in the longitudinal direction in accordance with the leg length of the user, thus measuring the body size of the user.

As shown in FIGS. 15 to 17, the measurement sensors L31 to L36 arranged in the lateral direction each are also the band-like measurement sensor 1200.

In the case shown in FIGS. 15 to 17, the measurement sensors L31 and L32 respectively arranged on portions corresponding to a portion of the waist of the size measurement apparatus 10 in the shape of tights and a portion around the hips. The measurement sensors L33 and L34 are respectively arranged on portions corresponding to portions around the right and left thighs. The measurement sensors L35 and L36 are respectively arranged on portions corresponding to portions around the right and left shins.

As described above, the right and left ends of the band-like measurement sensors L31 to L34 are respectively connected to the right and left ends of the non-extensible portion Ml, and the right and left ends of the band-like measurement sensors L35 and L36 are respectively connected to the right and left ends of the non-extensible portions M2 and M3.

Because portions of the size measurement apparatus 10 in the lateral direction are formed from the non-extensible portions M1 to M3 in the above manner, when the user wears the size measurement apparatus 10 on the lower part of the body as if wearing tights, only the portions of the measurement sensors L31 to L36 extend in the lateral direction (circumferential direction of waist and the like) in accordance with the sizes of the user, such as the waist and hip, thus measuring the body size of the user.

The measurement sensors L31 to L36, R31, and R32 may be attached to the front surface of the size measurement apparatus 10 so as to be exposed or may be attached to the back surface of the size measurement apparatus 10. Alternatively, when the main body unit 1 is formed from a plurality of fiber layers, these measurement sensors may be attached to the main body unit 1 so as to be sandwiched between the fiber layers.

Although not shown in FIGS. 15 to 17, each of the measurement sensors L31 to L36, R31, and R32 is connected to the detection unit 14 via a wiring. The control unit 11 calculates the capacitance value of each of the measurement sensors L31 to L36, R31, and R32 by the same method as that described above.

When the user wears the size measurement apparatus 10 in the shape of tights, each of the measurement sensors L31 to L36, R31, and R32 extends together with the main body unit 1 in accordance with the size of the user who has worn the size measurement apparatus 10.

Measuring the capacitances of the measurement sensors L31 to L36, R31, and R32 when they extend can measure the lengths of each leg and the length around the waist of the user.

[3] Summary of Third Embodiment

As described above, in the size measurement system according to the third embodiment of the present invention, because some of extensible measurement sensors are replaced with non-extensible portions made of relatively inexpensive non-extensible material (cloth or fiber material), the manufacturing cost of the size measurement apparatus 10 can be greatly reduced.

Forming some measurement sensors by using a non-extensible material can ensure a predetermined strength or more of the main body unit 1 of the size measurement apparatus 10. This makes it possible to prevent the size measurement apparatus 10 from, for example, losing its shape.

Although in this embodiment, the measurement sensors are arranged around the waist, hips, and the like, the arrangement positions of them are not limited to these. For example, some of the measurement sensors in the first or second embodiment may be replaced with non-extensible portions.

In this embodiment, the size measurement apparatus 10 has the shape of tights. However, this is not exhaustive. For example, this apparatus may have another shape such as a shirt or cap.

The measurement conversion DB may be managed by a user terminal 20 or a management server 30.

Each measurement sensor may be configured to measure a capacitance value, electric resistance value, or another electric characteristic.

Summary of Embodiment

As described above, the size measurement system according to the first embodiment of the present invention can specify the size and shape of the body of a user based on changes in characteristic of the measurement sensors (for example, amounts of change in capacitance or resistance value) when the user only wears the size measurement apparatus 10 on his/her body as if wearing tights, shirt, or the like. This makes it possible to easily search for apparel merchandise matching the body of the user.

The size measurement apparatus 10, the user terminal 20, and the management server 30 each are mainly implemented by a CPU and programs loaded in a memory. Note, however, that this apparatus or server can also be implemented by a combination of arbitrary hardware and software other than above components. Those skilled in the art easily understand that the degree of freedom of design is high.

When the size measurement apparatus 10, the user terminal 20, or the management server 30 described above is formed as a software module group, the corresponding program may be recorded on a recording medium such as an optical recording medium, magnetic recording medium, magnetooptical recording medium, or semiconductor recording medium and loaded from the recording medium or may loaded from an external device connected via a predetermined network.

Note that the above embodiments are examples of the preferred embodiments of the present invention, and that the embodiments of the present invention are not limited to them and can be variously modified within the spirit and scope of the invention.

For example, measurement sensors according to the first embodiment specify the shape and size of the body of a user based on the capacitances of the measurement sensors, whereas the measurement sensors according to the third modification of the first embodiment specify the shape and size of the body of the user based on resistance values. However, such measurement sensors may specify the shape and size of the body based on changes in other electric characteristics.

Any known techniques that are not described in this specification can be applied to arrangements for measuring capacitances or resistance values using measurement sensors.

According to the above embodiments, the user operates the user terminal 20 to start measurement. However, the user may operate a predetermined switch or the like provided on the size measurement apparatus 10 to start measurement.

In the above embodiments, the management server 30 receives sensor measurement information from the size measurement apparatus 10 via the user terminal 20. However, the management server 30 may directly receive sensor measurement information from the size measurement apparatus 10 via a wired/wireless communication network (for example, Wi-Fi, the Internet, or the 3G network) without via the user terminal 20.

The embodiments (including the modifications) described above can be combined, even though not directly described, as needed to form embodiments.

REFERENCE SIGNS LIST 1 main body unit
4 measurement processing unit
10 size measurement apparatus
11, 21, 31, control unit
12, 22, 32 information storage unit
13, 23, 33 communication unit
14 detection unit
15 measurement unit
20 user terminal
24 display unit
25 operation unit
30 management server
100 base material
321 sensor measurement DB
322 measurement conversion DB
323 user measurement DB
324 merchandise DB
1200, L1 to L12, L21 to L24, L31 to L36, R1 to R5, R21, R22, R31, R32 measurement sensor
1201 dielectric film
1202, 1203 electrode
M1 to M3 non-extensible portion

The invention claimed is:

1. A size measurement apparatus that a user wears on a body part to specify a size and a shape of the body part, characterized by comprising measurement sensors each configured to measure a physical change amount based on a change in electric characteristic;
   the measurement sensors each measuring a degree of extension of a base material caused by the shape of the body of the user, the measurement sensors in an extensible band-like or ring-like shape;
   non-extensible portions formed of non-extensible material; and
   wherein the measurement sensors are connected directly to and extend between the non-extensible portions.

2. The size measurement apparatus according to claim 1, characterized by comprising a main body unit in a clothing shape,
   wherein the measurement sensors are formed from an extensible material and arranged on the main body unit in a lattice shape.

3. The size measurement apparatus according to claim 1, characterized by comprising a main body unit in a clothing shape,
   wherein the measurement sensors are formed from an extensible material and arranged at an arbitrary position of the main body unit at which a clothing dimension or body dimension is usually measured.

4. The size measurement apparatus according to any one of claims 1 to 3, characterized in that the measurement sensors each comprise a plate-like electrode having extensibility and specifies a degree of extension of the electrode caused by a shape of a body of a user based on a change in electric resistance value due to extension of the electrode upon application of a tensile force.

5. A size measurement system characterized by comprising:
   a size measurement apparatus defined in any one of claims 1 to 3;
   a user terminal configured to acquire data representing a change in electric characteristic measured by the measurement sensors from the size measurement apparatus; and a management server configured to acquire data representing the change in electric characteristic from the user terminal, convert the acquired data representing the change in electric characteristic into data representing a physical change amount, and provide the data to the user terminal.

6. The size measurement system according to claim 5, characterized in that the management server includes a database configured to manage a size and a shape of apparel merchandise, refers to the database upon conversion to data representing the physical change amount, searches for the apparel merchandise matching data representing the physical change amount, and transmits the search result to the user terminal.

7. The size measurement system according to claim 6, characterized in that the management server transmits, to the user terminal, information including a URL of a Web page for purchase of the apparel merchandise as merchandise search result information indicating a search result on the apparel merchandise, and the user terminal acquires a Web page for purchase of the apparel merchandise by using information including the URL.

8. A size measurement system characterized by comprising:

a size measurement apparatus defined in any one of claims 1 to 3;

a user terminal configured to be operated by the user; and a management server configured to acquire data representing the change in electric characteristic from the size measurement apparatus, convert the acquired data representing the change in electric characteristic into data representing a physical change amount, and provide the data to the user terminal.

9. The size measurement system according to claim 8, characterized in that the management server includes a database configured to manage a size and a shape of apparel merchandise, refers to the database upon conversion to data representing the physical change amount, searches for the apparel merchandise matching data representing the physical change amount, and transmits the search result to the user terminal.

10. The size measurement apparatus according to any one of claims 1 to 3, characterized in that the measurement sensors each comprise a pair of plate-like electrodes and a dielectric film arranged between the pair of electrodes and specifies a degree of extension of the electrodes caused by a shape of a body of a user based on a change in capacitance due to extension of the electrodes upon application of a tensile force.

* * * * *